(12) United States Patent
Mannengal et al.

(10) Patent No.: US 11,184,423 B2
(45) Date of Patent: Nov. 23, 2021

(54) OFFLOADING UPLOAD PROCESSING OF A FILE IN A DISTRIBUTED SYSTEM USING A KEY THAT INCLUDES A HASH CREATED USING ATTRIBUTE(S) OF A REQUESTOR AND/OR THE FILE

(71) Applicant: Microsoft Technology Licensing, LLC, Redmond, WA (US)

(72) Inventors: Arun Ramadasan Mannengal, Sammamish, WA (US); Ashish Basran, Sammamish, WA (US); Jawad Ahmed Ibrahim Katib, Sammamish, WA (US); Avinash Chandru, Bothell, WA (US); Shreeja Subrata Datta, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/169,941

(22) Filed: Oct. 24, 2018

(65) Prior Publication Data

US 2020/0137141 A1 Apr. 30, 2020

(51) Int. Cl.
| | | |
|---|---|---|
| H04L 29/08 | (2006.01) | |
| H04L 9/08 | (2006.01) | |
| G06F 9/50 | (2006.01) | |
| G06F 15/16 | (2006.01) | |
| G06F 21/60 | (2013.01) | |
| H04L 9/06 | (2006.01) | |
| H04L 9/00 | (2006.01) | |

(Continued)

(52) U.S. Cl.
CPC ............ *H04L 67/06* (2013.01); *G06F 9/5005* (2013.01); *G06F 9/541* (2013.01);
(Continued)

(58) Field of Classification Search
CPC ..... H04L 67/06; H04L 9/0643; H04L 9/0861; H04L 9/088; H04L 9/0819;
(Continued)

(56) References Cited

U.S. PATENT DOCUMENTS 8,620,879 B2 * 12/2013 Cairns ................. H04L 67/1097
707/692
8,943,348 B2 1/2015 Lin et al.
(Continued)

FOREIGN PATENT DOCUMENTS

| CN | 105227581 A | 1/2016 |
|---|---|---|
| CN | 107426331 A | 12/2017 |
| EP | 3035641 A1 | 6/2016 |
| WO | 03019412 A2 | 3/2003 |

OTHER PUBLICATIONS

"Upload a File to WildFire for Analysis", Retrieved from: https://www.paloaltonetworks.com/documentation/34/endpoint/endpoint-admin-guide/malware-protection/manage-hashes-for-executable-files/upload-a-file-to-wildfire-for-analysis, Retrieved on Aug. 17, 2018, 9 Pages.

(Continued)

*Primary Examiner* — Emmanuel L Moise
*Assistant Examiner* — Berhanu Shitayewoldetadik
(74) *Attorney, Agent, or Firm* — Wade IP Law PLLC

(57) ABSTRACT

Techniques are described herein that are capable of offloading upload processing of a file in a distributed system. A request is received from a requestor to upload a file to a transactional database of a DBMS. Information regarding the requestor and/or the file is extracted from the request. A determination is made that the file is to be uploaded to a non-indexing file storage system in lieu of the transactional database based at least in part on the extracted information satisfying one or more criteria. A key that includes a hash is generated. The hash is created using attribute(s) of the requestor and/or the file from the extracted information. The key is provided to the requestor. The key and at least a portion of the file are received from the requestor. Uploading of the file to the non-indexing file storage system in lieu of the transactional database is initiated.

21 Claims, 8 Drawing Sheets

(51) Int. Cl.
*G06F 16/18* (2019.01)
*G06F 9/54* (2006.01)

(52) U.S. Cl.
CPC ........ *G06F 16/1865* (2019.01); *H04L 9/0643* (2013.01); *H04L 9/088* (2013.01); *H04L 9/0819* (2013.01); *H04L 9/0861* (2013.01); *G06F 2209/509* (2013.01)

(58) Field of Classification Search
CPC .... G06F 16/1865; G06F 9/541; G06F 9/5005; G06F 2209/509
USPC .......................................................... 709/203
See application file for complete search history.

(56) References Cited

U.S. PATENT DOCUMENTS

| | | | | |
|---|---|---|---|---|
| 9,135,462 B2* | 9/2015 | Scharf | | H04L 63/0428 |
| 9,143,557 B2* | 9/2015 | Guichard | | H04L 67/16 |
| 9,219,724 B1* | 12/2015 | Choudhary | | H04L 67/20 |
| 9,369,520 B2 | 6/2016 | Luecke et al. | | |
| 10,380,141 B1* | 8/2019 | Chepel | | G06F 11/1471 |
| 2002/0073104 A1* | 6/2002 | Nunez | | G06F 16/2228 |
| 2002/0111972 A1* | 8/2002 | Lynch | | G06F 9/4451 |
| | | | | 715/236 |
| 2003/0050841 A1* | 3/2003 | Preston | | G06Q 20/20 |
| | | | | 705/16 |
| 2003/0177250 A1* | 9/2003 | Oliver | | G06F 21/33 |
| | | | | 709/229 |
| 2004/0083347 A1* | 4/2004 | Parson | | G06F 16/9014 |
| | | | | 711/165 |
| 2004/0181493 A1* | 9/2004 | Cross | | G06Q 20/401 |
| | | | | 705/75 |
| 2004/0210584 A1 | 10/2004 | Nir et al. | | |
| 2005/0010792 A1* | 1/2005 | Carpentier | | G06F 16/137 |
| | | | | 713/193 |
| 2005/0192904 A1* | 9/2005 | Candelore | | H04L 9/0861 |
| | | | | 705/51 |
| 2005/0289394 A1* | 12/2005 | Arrouye | | G06F 16/13 |
| | | | | 714/15 |
| 2006/0059253 A1* | 3/2006 | Goodman | | G06Q 10/06 |
| | | | | 709/223 |
| 2006/0137015 A1* | 6/2006 | Fahmy | | H04N 21/235 |
| | | | | 726/26 |
| 2007/0038681 A1* | 2/2007 | Pierce | | G06F 11/1469 |
| 2008/0301247 A1* | 12/2008 | Halim | | G06F 16/1787 |
| | | | | 709/206 |
| 2009/0132813 A1* | 5/2009 | Schibuk | | G06Q 20/322 |
| | | | | 713/158 |
| 2009/0138480 A1* | 5/2009 | Chatley | | H04L 67/1012 |
| 2010/0036821 A1* | 2/2010 | Oh | | G06F 16/958 |
| | | | | 707/742 |
| 2011/0004555 A1* | 1/2011 | Onda | | H04L 63/06 |
| | | | | 705/59 |
| 2011/0087690 A1* | 4/2011 | Cairns | | G06F 16/137 |
| | | | | 707/769 |
| 2012/0047365 A1* | 2/2012 | Mercer | | G06F 21/606 |
| | | | | 713/168 |
| 2012/0089841 A1* | 4/2012 | Boyer | | G06F 21/64 |
| | | | | 713/175 |
| 2012/0136902 A1* | 5/2012 | Oyarzabal | | G06F 16/40 |
| | | | | 707/802 |
| 2012/0233293 A1* | 9/2012 | Barton | | G06F 11/1004 |
| | | | | 709/219 |
| 2013/0061055 A1* | 3/2013 | Schibuk | | G06Q 20/223 |
| | | | | 713/172 |
| 2013/0067232 A1* | 3/2013 | Cheung | | H04L 9/3247 |
| | | | | 713/176 |
| 2013/0138570 A1* | 5/2013 | Ross | | H04L 63/0861 |
| | | | | 705/67 |
| 2013/0246783 A1* | 9/2013 | Ho | | H04L 9/0861 |
| | | | | 713/150 |
| 2013/0290234 A1* | 10/2013 | Harris | | G06N 5/022 |
| | | | | 706/46 |
| 2013/0332723 A1* | 12/2013 | Tan | | H04L 63/0807 |
| | | | | 713/150 |
| 2014/0003232 A1* | 1/2014 | Guichard | | H04L 67/1029 |
| | | | | 370/230 |
| 2014/0068254 A1* | 3/2014 | Scharf | | G06F 21/6218 |
| | | | | 713/165 |
| 2014/0071482 A1* | 3/2014 | Ishibashi | | H04N 1/2166 |
| | | | | 358/1.15 |
| 2014/0082079 A1* | 3/2014 | Dunsmuir | | H04N 21/21805 |
| | | | | 709/204 |
| 2014/0082749 A1* | 3/2014 | Holland | | G06F 21/645 |
| | | | | 726/29 |
| 2014/0129830 A1* | 5/2014 | Raudaschl | | G06F 21/6272 |
| | | | | 713/165 |
| 2014/0136733 A1* | 5/2014 | Dunsmuir | | H04N 21/8547 |
| | | | | 709/248 |
| 2014/0282900 A1* | 9/2014 | Wang | | H04L 63/0428 |
| | | | | 726/4 |
| 2014/0310709 A1 | 10/2014 | Nirantar | | |
| 2014/0325312 A1* | 10/2014 | Kishi | | G06F 3/0619 |
| | | | | 714/764 |
| 2015/0124652 A1* | 5/2015 | Dharmapurikar | | G11C 15/04 |
| | | | | 370/255 |
| 2015/0249694 A1* | 9/2015 | Kinkade | | G06F 16/178 |
| | | | | 709/204 |
| 2015/0365385 A1* | 12/2015 | Hore | | H04L 63/06 |
| | | | | 713/152 |
| 2015/0381587 A1* | 12/2015 | Scharf | | H04L 63/0428 |
| | | | | 713/165 |
| 2016/0028761 A1* | 1/2016 | Sitsky | | G06F 21/568 |
| | | | | 726/23 |
| 2016/0055557 A1* | 2/2016 | Choudhary | | H04L 63/104 |
| | | | | 705/26.35 |
| 2016/0285630 A1* | 9/2016 | Abraham | | H04W 12/03 |
| 2016/0300080 A1* | 10/2016 | Shah | | H04L 9/0861 |
| 2016/0306862 A1* | 10/2016 | Sitsky | | G06F 16/254 |
| 2016/0321290 A1* | 11/2016 | Luthra | | G06F 12/122 |
| 2016/0328438 A1* | 11/2016 | Bacalzo | | G06F 16/2365 |
| 2017/0005807 A1* | 1/2017 | Wu | | H04L 9/0894 |
| 2017/0103217 A1* | 4/2017 | Arasu | | H04L 9/0637 |
| 2017/0109251 A1* | 4/2017 | Das | | G06F 9/45558 |
| 2017/0149562 A1* | 5/2017 | Takada | | B60R 16/023 |
| 2017/0154092 A1* | 6/2017 | Reimer | | G06F 16/2322 |
| 2017/0188231 A1* | 6/2017 | Nix | | H04L 9/0816 |
| 2017/0206218 A1 | 7/2017 | Jai et al. | | |
| 2017/0262638 A1* | 9/2017 | Horowitz | | G06F 21/602 |
| 2017/0270602 A1* | 9/2017 | Snell | | G06F 16/122 |
| 2017/0293766 A1* | 10/2017 | Schnjakin | | G06F 21/335 |
| 2018/0025167 A1* | 1/2018 | Bohli | | H04L 9/14 |
| | | | | 713/193 |
| 2018/0095802 A1* | 4/2018 | Nguyen | | G06F 9/5044 |
| 2018/0150645 A1* | 5/2018 | Toshok | | G06F 21/6254 |
| 2018/0165131 A1 | 6/2018 | O'hare et al. | | |
| 2018/0189784 A1* | 7/2018 | Grabowski | | G06Q 20/223 |
| 2018/0217997 A1 | 8/2018 | Burshteyn | | |
| 2018/0219687 A1* | 8/2018 | Popa | | H04L 9/0891 |
| 2018/0232388 A1* | 8/2018 | Burns | | H04L 67/06 |
| 2018/0285205 A1* | 10/2018 | Mehta | | G06F 16/182 |
| 2019/0026047 A1* | 1/2019 | Balko | | G06F 3/0604 |
| 2019/0028441 A1* | 1/2019 | Thakkar | | H04N 21/4405 |
| 2019/0057379 A1* | 2/2019 | Chalakudi | | G06Q 20/38215 |
| 2019/0097790 A1* | 3/2019 | Li | | H04L 9/085 |
| 2019/0124146 A1* | 4/2019 | Austin | | H04L 9/3236 |
| 2019/0318078 A1* | 10/2019 | Liu | | H04L 9/0625 |
| 2019/0342084 A1* | 11/2019 | Mehedy | | H04L 9/0643 |
| 2019/0377811 A1* | 12/2019 | Aleksander | | G06F 9/466 |

OTHER PUBLICATIONS

"International Search Report and Written Opinion Issued in PCT Application No. PCT/US2019/044009", dated Sep. 13, 2019, 12 Pages.

* cited by examiner

OFFLOADING UPLOAD PROCESSING OF A FILE IN A DISTRIBUTED SYSTEM USING A KEY THAT INCLUDES A HASH CREATED USING ATTRIBUTE(S) OF A REQUESTOR AND/OR THE FILE

BACKGROUND

Cloud computing services are becoming increasingly popular with users of computing devices. For instance, cloud computing providers may upload solutions to servers to enable the servers to serve the solutions as cloud computing services to users via a network, such as the Internet. For example, the cloud computing services may enable the users to access shared resources that are stored on or are otherwise accessible to the servers via the network. Users of a cloud computing service may upload files to servers of the cloud computing provider for storage and/or processing. Uploading files in conventional cloud computing systems may raise concerns about security of the users' files during the upload process and security of other files on the servers in the presence of the users' files, especially when the cloud computing system is a distributed system.

SUMMARY

Various approaches are described herein for, among other things, offloading upload processing of a file in a distributed system using a key that includes a hash created using attribute(s) of a requestor and/or the file. Upload processing is processing that is performed to send information (e.g., a file) from a first computing system, such as a user device (a.k.a. client device), to one or more second computing systems, such as cloud-based server(s), via a network. Examples of a file include but are not limited to an email, a word processing document, a spreadsheet, a still image (e.g., photograph), a video, a portable document format (PDF) document, a contract, and a crash dump. A distributed system is a system in which multiple computing systems (e.g., computers) collaborate to solve a problem. For instance, each of the computing systems may solve a respective part of the problem.

Upload processing may be offloaded from a transactional database to a non-indexing file storage system. A transactional database is a database in which transactions are used to make changes. A transaction is a unit of work that is atomic, consistent, isolated, and durable. Persons skilled in the art often refer to these properties as the ACID properties. A unit of work may include multiple database operations. An atomic unit of work is a unit of work that includes an indivisible and irreducible set of database operation(s). Accordingly, database operations in the unit of work either all succeed (i.e., all the database operations take effect) or all fail (i.e., none of the database operations take effect). A consistent unit of work is a unit of work in which the database operations therein are performed accurately, correctly, and with validity, with respect to application semantics. An isolated unit of work is a unit of work for which an extent of isolation is defined. The extent of isolation indicates how and/or when changes made by database operation(s) in the unit of work become visible to other users and/or systems. A durable unit of work is a unit of work for which commitment is guaranteed to survive (e.g., following a loss of power). A database (e.g., the transactional database mentioned above) indexes data using database indexes that facilitate searching for data in designated columns in the database. A database index is a data structure (e.g., B-tree or hash table) that stores values for a designated column in a table. A file storage system, on the other hand, does not index data using database indexes. To emphasize this difference between databases and file storage systems, file storage systems are referred to herein as non-indexing file storage systems.

In an example approach, a request from a requestor to upload a file to a transactional database of a database management system in a distributed system is received. Information regarding the requestor and/or the file is extracted from the request. A determination is made that the file is to be uploaded to a non-indexing file storage system in lieu of the transactional database based at least in part on the extracted information satisfying one or more criteria. A key that includes a hash is generated by converting specified information from the extracted information and a secret to create the hash. The specified information includes attribute(s) of the requestor and/or attribute(s) of the file. The key is provided to the requestor (e.g., based at least in part on a determination that the file is to be uploaded to the non-indexing file storage system in lieu of the transactional database). The key and at least a portion of the file are received from the requestor. Uploading of the file to the non-indexing file storage system in lieu of the transactional database is initiated based at least in part on receipt of the key from the requestor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
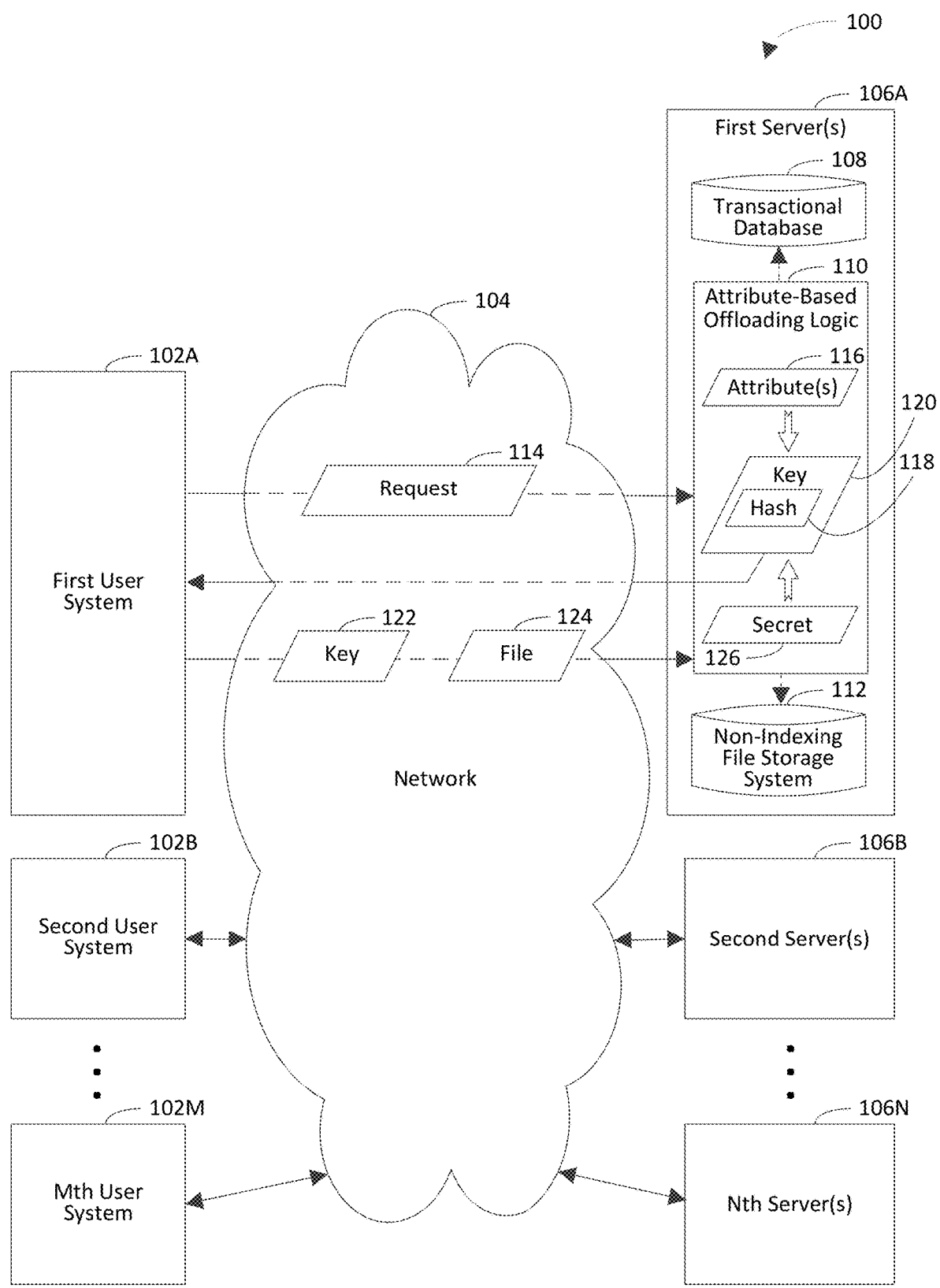
FIG. 1 is a block diagram of an example attribute-based offloading system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of offloading upload processing of a file in a distributed system using a key that includes a hash created using attribute(s) of a requestor and/or the file. Upload processing is processing that is performed to send information (e.g., a file) from a first computing system, such as a user device (a.k.a. client device), to one or more second computing systems, such as cloud-based server(s), via a network. Examples of a file include but are not limited to an email, a word processing document, a spreadsheet, a still image (e.g., photograph), a video, a portable document format (PDF) document, a contract, and a crash dump. A distributed system is a system in which multiple computing systems (e.g., computers) collaborate to solve a problem. For instance, each of the computing systems may solve a respective part of the problem.

Upload processing may be offloaded from a transactional database to a non-indexing file storage system. A transactional database is a database in which transactions are used to make changes. A transaction is a unit of work that is atomic, consistent, isolated, and durable. Persons skilled in the art often refer to these properties as the ACID properties. A unit of work may include multiple database operations. An atomic unit of work is a unit of work that includes an indivisible and irreducible set of database operation(s). Accordingly, database operations in the unit of work either all succeed (i.e., all the database operations take effect) or all fail (i.e., none of the database operations take effect). A consistent unit of work is a unit of work in which the database operations therein are performed accurately, correctly, and with validity, with respect to application semantics. An isolated unit of work is a unit of work for which an extent of isolation is defined. The extent of isolation indicates how and/or when changes made by database operation(s) in the unit of work become visible to other users and/or systems. A durable unit of work is a unit of work for which commitment is guaranteed to survive (e.g., following a loss of power). A database (e.g., the transactional database mentioned above) indexes data using database indexes that facilitate searching for data in designated columns in the database. A database index is a data structure (e.g., B-tree or hash table) that stores values for a designated column in a table. A file storage system, on the other hand, does not index data using database indexes. To emphasize this difference between databases and file storage systems, file storage systems are referred to herein as non-indexing file storage systems.

Example techniques described herein have a variety of benefits as compared to conventional techniques for uploading a file. For instance, the example techniques may be capable of determining whether a file should be uploaded to a transactional database or to a non-indexing file storage system when a request to upload the file to the transactional database is received from a requestor. For instance, the example techniques may gather information about the requestor and/or the file from the request. By comparing this information to reference information, the determination may be made. Uploading the file to the non-indexing file storage system, rather than the transactional database, may reduce an amount of time and/or resources (e.g., memory, processor cycles, network bandwidth) that is consumed to upload the file, store the file, and/or access the file once the file is uploaded. For instance, uploading the file to the non-indexing file storage system, rather than the transactional database, may reduce a number of times memory in the distributed system is accessed to upload, store, and/or access the file. It will be recognized that uploading the file to the non-indexing file storage system may avoid operations commonly associated with databases, including but not limited to indexing content of the file using database indexes. Accordingly, uploading the file to the non-indexing file storage system may reduce a cost associated with uploading, storing, and/or accessing the file. The example techniques may increase efficiency of a computing system that is used to upload, store, and/or access the file (e.g., by avoiding indexing operations associated with databases).

The example techniques may be capable of uploading a file in response to a request from a requestor without disclosing to the requestor a location to which the file is to be uploaded. By not disclosing the location to the requestor, security of the file, other files in the distributed system, and computing system(s) in the distributed system that store these files may be increased. The example techniques may enable a cloud computing provider to control which content the requestor is able to upload to servers of the cloud computing provider. The cloud computing provider may determine whether a file that is received from the requestor is allowed to be uploaded based on whether attribute(s) of the file match reference attribute(s). For instance, by requiring the requestor to provide a key that includes a hash of information associated with the requestor and/or the file along with the request to upload the file, the cloud computing provider may allow the file to be uploaded only if the key matches a key that is stored by the cloud computing provider. Accordingly, requiring the requestor to provide the key may increase security of the file, other files in the distributed system, and computing system(s) in the distributed system that store these files. Moreover, even if the key that is received from the requestor matches the key that is stored by the cloud computing provider, the cloud computing provider may analyze content of the file to ensure that the content does not include disallowed content. Disallowed content is content that a cloud computing provider does not allow to be uploaded to servers of the cloud computing provider. For instance, the disallowed content may include malware, illegal content, or sexually explicit content. Accordingly, the cloud computing provider may allow the file to be uploaded only if the content of the file does not include disallowed content.

Distributed storage of an application programming interface (API) endpoint-aware store in a session mode of consistency may increase a likelihood that "availability" and "reliability" measures are met while achieving the correct consistency. Confirming that a key received from the requestor and a key that is stored in a cache are the same prior to initiating uploading of a file may avoid the penalty of validation at the server. A client package having an automatic method may be provided to a user device to perform appropriate redirects to facilitate offloading of upload processing in accordance with the embodiments described herein. For instance, the client package may include a client library and/or a software development kit (SDK). The example techniques may facilitate scaling of the transactional database by distributing the workload of the transactional database. For example, the workload associated with uploading the file may be transferred from the transactional database to the non-indexing file storage system. The example techniques may be applicable to any of a variety of application development paradigms.

FIG. 1 is a block diagram of an example attribute-based offloading system 100 in accordance with an embodiment. Generally speaking, attribute-based offloading system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, attribute-based offloading system 100 selectively offloads upload processing of files to a non-indexing file storage system in lieu of a transactional database in a distributed system, in response to receipt of requests from requestors to upload the files to the transactional database, depending at least in part on whether information regarding the requestors and/or the files satisfies one or more criteria. Detail regarding techniques for offloading upload processing of a file in a distributed system is provided in the following discussion.

As shown in FIG. 1, attribute-based offloading system 100 includes a plurality of user systems 102A-102M, a network 104, and a plurality of servers 106A-106N. Communication among user systems 102A-102M and servers 106A-106N is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N, requesting that files be uploaded in accordance with a cloud computing service. For instance, a user may initiate a request to upload a file using a client (e.g., a Web browser) deployed on a user system 102 that is owned by or otherwise accessible to the user. In accordance with some example embodiments, user systems 102A-102M are capable of accessing domains (e.g., Web sites) hosted by servers 106A-106N, so that user systems 102A-102M may access information that is available via the domains. Such domains may include Web pages, which may be provided as hypertext markup language (HTML) documents and objects (e.g., files) that are linked therein, for example.

Each of user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more user systems 102A-102M may communicate with any one or more servers 106A-106N.

Servers 106A-106N are processing systems that are capable of communicating with user systems 102A-102M. Servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, servers 106A-106N are configured to host respective Web sites, so that the Web sites are accessible to users of attribute-based offloading system 100.

One example type of a computer program that may be executed by one or more of the servers 106A-106N is a cloud computing program. A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include but are not limited to Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., AppSource® developed and distributed by Microsoft Corporation, Azure® developed and distributed by Microsoft Corporation, GoDaddy® developed and distributed by GoDaddy.com LLC, and Rackspace® developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

First server(s) 106A are shown to include a transactional database 108, attribute-based offloading logic 110, and a non-indexing file storage system 112 for illustrative purposes. Transactional database 108 is configured to store files that are received from attribute-based offloading logic 110 and to index the files using database indexes. Non-indexing file storage system 112 is configured to store files that are received from attribute-based offloading logic 110 without indexing the files using database indexes.

Attribute-based offloading logic 110 is configured to selectively offload upload processing of a file 124 in a distributed system. Attribute-based offloading logic 110 receives a cloud service request 114 from a requestor (e.g., a user of first user system 102A or an application executing on first user system 102A). The cloud service request 114 requests that the file 124 be uploaded to transactional database 108. Attribute-based offloading logic 110 extracts information regarding the requestor and/or the file 124 from the request 114. Attribute-based offloading logic 110 determines whether the file 124 is to be uploaded to non-indexing file storage system 112 in lieu of transactional database 108 depending at least in part on whether the extracted information satisfies one or more criteria. Attribute-based offloading logic 110 generates a key 120 that includes a hash 118 by converting specified information, which includes attribute(s) 116 of the requestor and/or of the file 124, from the extracted information and a secret 126 to create the hash 118. In response to determining that the file 124 is to be uploaded to non-indexing file storage system 112 in lieu of transactional database 108, attribute-based offloading logic 110 provides the key 120 to the requestor. Attribute-based offloading logic 110 receives the key 122 and at least a portion of the file 14 from the requestor. Attribute-based offloading logic 110 initiates uploading of the file 124 to non-indexing file storage system 112 in lieu of transactional database 108 based at least in part on receipt of the key 122 from the requestor. For instance, attribute-based offloading logic 110 may initiate uploading of the file 124 to non-indexing file storage system 112 based at least in part on the key 122 from the requestor matching (e.g., being same as) the key 120 generated by attribute-based offloading logic 110.

It will be recognized that attribute-based offloading logic 110 may be (or may be included in) a cloud computing program, though the scope of the example embodiments is not limited in this respect. Transactional database 108, attribute-based offloading logic 110, and non-indexing file storage system 112 are shown to be incorporated in first server(s) 106A for illustrative purposes and are not intended to be limiting. It will be recognized that each of transactional database 108, attribute-based offloading logic 110, and non-indexing file storage system 112 (or any portion(s) thereof) may be incorporated in any one or more of servers 106A-106N.

Attribute-based offloading logic 110 may be implemented in various ways to selectively offload upload processing of file(s) in a distributed system, including being implemented in hardware, software, firmware, or any combination thereof. For example, attribute-based offloading logic 110 may be implemented as computer program code configured to be executed in one or more processors. In another example, attribute-based offloading logic 110 may be implemented as hardware logic/electrical circuitry. For instance, attribute-based offloading logic 110 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Attribute-based offloading logic 110 is shown to be incorporated in first server(s) 106A for illustrative purposes and is not intended to be limiting. It will be recognized that attribute-based offloading logic 110 (or any portion(s) thereof) may be incorporated in any one or more of the user systems 102A-102M. For example, client-side aspects of attribute-based offloading logic 110 may be incorporated in one or more of the user systems 102A-102M, and server-side aspects of attribute-based offloading logic 110 may be incorporated in first server(s) 106A. In another example, attribute-based offloading logic 110 (or any portion(s) thereof) may be distributed among the server(s) 106A-106N. In still another example, attribute-based offloading logic 110 may be incorporated in a single one of the servers(s) 106A-106N.

Figure 2:
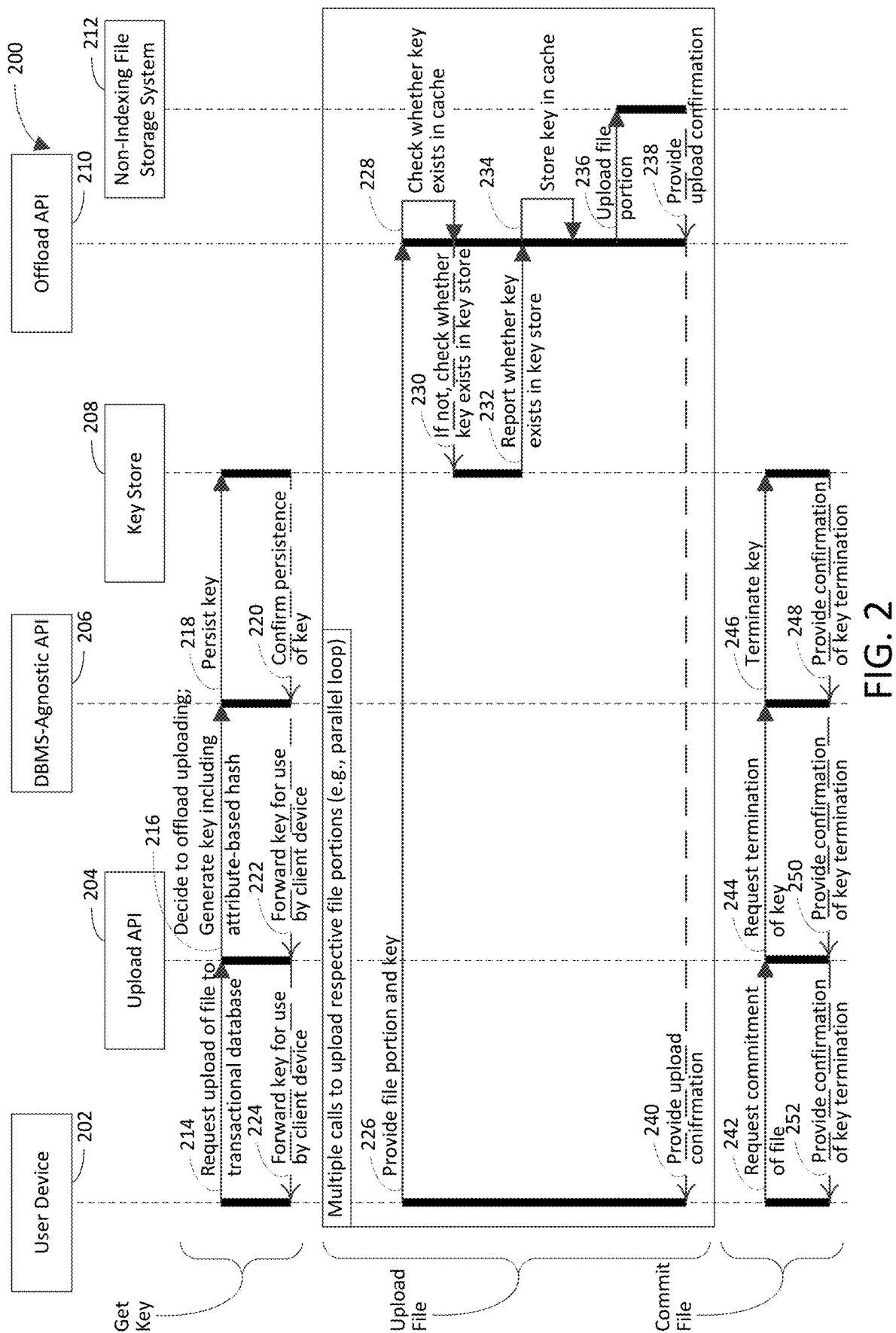
FIG. 2 is an example activity diagram in accordance with an embodiment.

FIG. 2 is an example activity diagram 200 in accordance with an embodiment. FIG. 2 depicts a user device 202, an upload application programming interface (API) 204, a database management system-agnostic (DBMS-agnostic) API 206, a key store 208, an offload API 210, and a non-indexing file storage system 212. Activities 214, 216, 218, 220, 222, 224, 226, 228, 230, 232, 234, 236, 238, 240, 242, 244, 246, 248, 250, and 252 will now be described with reference to user device 202, upload API 204, DBMS-agnostic API 206, key store 208, offload API 210, and non-indexing file storage system 212.

To provide context, it should be noted that activities 214, 216, 218, 220, 222, and 224 collectively may constitute a "Get Key" transaction during which user device 202 obtains a key from key store 208. Activities 226, 228, 230, 232, 234, 236, and 238 collectively may constitute an "Upload File" transaction during which offload API 210 uploads a file based at least in part on receipt of the file and the key from user device 202. As indicated in FIG. 2, the activities of the Upload File transaction are performed for each portion of the file that is to be uploaded to non-indexing file storage system 212. Any one or more of the portions may be uploaded in parallel (e.g., simultaneously) with any one or more other potions. For instance, all of the portions may be uploaded in parallel. Activities 242, 244, 246, 248, 250, and 252 collectively may constitute a "Commit File" transaction during which user device 202 causes the file to be committed to non-indexing file storage system 212.

In activity 214, user device 202 provides a request to upload API 204. The request requests that a file be uploaded to a transactional database (e.g., transactional database 108 in FIG. 1). For example, user device 202 may be owned or controlled by a customer of a cloud service. User device 202 (e.g., an application running on client device 202) may generate the request based on (e.g., based at least in part on) instructions that are received from the customer. The instructions from the customer may indicate that the customer wishes to upload the file via the cloud service.

In activity 216, upload API 204 decides that uploading of the file is to be offloaded to non-indexing file storage system 212 based on one or more criteria. Examples of such a criterion include but are not limited to a file name of the file and a reference file semantically matching, a type (e.g., a multipurpose Internet mail extension (MIME) type) of the file and a reference type being same, a size of the file being greater than or equal to a reference file size, content of the file including (or not including) reference content, an estimated workload associated with uploading the file to the transactional database being greater than or equal to a threshold workload, a location (e.g., folder or store) in which the file is stored and a reference location being same (or different), an entity (e.g., case, lead, opportunity, or product) with which the file is associated and a reference entity being same, a credential of the requestor and a reference credential being same, and an organization to which the requestor belongs and a reference organization being same. The estimated workload may be an estimated amount of processing resources and/or memory resources to be consumed to upload the file to the transactional database.

The decision to offload uploading of the file may be based at least in part on preference(s) of the customer. For instance, any of the example criteria mentioned above may be based on a preference of the customer. For example, the preference(s) of the customer may include a preference to upload files of a designated type to a non-indexing file storage system, a preference to upload files having a size greater than or equal to a size threshold to a non-indexing file storage system, a preference to upload a file having a designated file name to a non-indexing file storage system, a preference to upload a file that includes designated content to a non-indexing file storage system, a preference to upload files from a designated location to a non-indexing file storage system, etc.

In activity 216, upload API 204 also generates a key that includes a hash, which is based on a secret and attribute(s) of the customer and/or the file. Upload API 204 extracts the attribute(s) from the request, generates the secret, and creates the hash using the secret and the attribute(s). Examples of an attribute of the customer include but are not limited to a credential (e.g., ID) of the customer and an entity to which the customer belongs (e.g., team, organization, domain). Examples of an attribute of the file include but are not limited to a file name of the file and a size of the file.

In activity 218, DBMS-agnostic API 206 persists the key in key store 208. DBMS-agnostic API 206 may validate that the key was generated by upload API 204 prior to persisting the key in key store 208. For instance, DBMS-agnostic API 206 may persist the key in key store 208 based at least in part on validation that the key was generated by upload API 204.

In activity 220, key store 208 provides a confirmation (e.g., acknowledgement), confirming that the key has been persisted in key store 208.

In activity 222, DBMS-agnostic API forwards the confirmation that is received from key store 208 to upload API 204.

In activity 224, upload API 204 forwards the confirmation that is received from DBMS-agnostic API 206 to user device 202.

In activity 226, user device 202 provides the key that was received from upload API in activity 224 and a portion of the file to offload API 210.

In activity 228, offload API 210 checks whether the key exists in a cache (i.e., whether the key that is received in activity 226 is the same as a key in the cache). If the key does not exist in the cache, activities 230, 232, and 234 are performed. If the key exists in the cache, activities 230, 232, and 234 need not necessarily be performed.

In activity 230, offload API 210 checks whether the key exists in key store 208 (i.e., whether the key that is received in activity 226 is the same as a key in key store 208). For instance, offload API 210 may provide a query to key store 208, inquiring whether the key exists in key store 208.

In activity 232, key store 208 reports whether the key exists in key store 208. For instance, key store 208 may provide a response to the query, indicating that the key is stored in key store 208 or that the key is not stored in key store 208. Key store 208 may provide the key (e.g., a copy thereof) to offload API 210 (e.g., based at least in part on the query).

In activity 234, offload API 210 stores the key in the cache.

In activity 236, offload API 210 uploads the portion of the file that was received from user device 202 in activity 226 to non-indexing file storage system 212 (e.g., based at least in part on the key existing in key store 208 and/or in the cache).

In activity 238, non-indexing file storage system 212 provides a confirmation to offload API 210, confirming that the portion of the file has been uploaded to non-indexing file storage system 212.

In activity 240, offload API 210 provides a confirmation to user device 202, confirming that the portion of the file has been uploaded to non-indexing file storage system 212. The confirmation provided by offload API 210 and the confirmation received by offload API 210 from non-indexing file storage system 212 may be the same or different. For example, offload API 210 may forward the confirmation that is received from non-indexing file storage system 212 to user device 202. In another example, offload API 210 may generate the confirmation that is provided to user device 202 in response to receipt of the confirmation that is provided to offload API 210 by non-indexing file storage system 212.

In activity 242, user device 202 provides a request to upload API 204 to commit the file to non-indexing file storage system 212.

In activity 244, upload API provides a request to DBMS-agnostic API 206 to terminate the key (e.g., based at least in part on the request that is received from user device 242).

In activity 246, DBMS-agnostic API 206 terminates the key that was persisted in key store 208 in activity 218 (e.g., based at least in part on the request that is received from DBMS-agnostic API 206). DBMS-agnostic API 206 may perform validation(s) on the uploaded file to determine whether the uploaded file is to be deleted from non-indexing file storage system 212. For example, DBMS-agnostic API 206 may check whether the file includes disallowed content. In accordance with this example, if the file includes disallowed content, DBMS-agnostic API 206 may cause the file to be removed from non-indexing file storage system 212.

DBMS-agnostic API 206 may perform validation(s) on each portion of the file that is uploaded (e.g., in real-time as the portions are uploaded). For example, if DBMS-agnostic API 206 determines that any uploaded portion of the file includes disallowed content, DBMS-agnostic API 206 may discontinue uploading of the file. In accordance with this example, DBMS-agnostic API 206 may not upload the portion that includes the disallowed content and any further portions of the file that have not yet been uploaded.

In activity 248, key store 208 provides a confirmation to DBMS-agnostic API 206, confirming that the key that was persisted in key store 208 in activity 218 has been terminated.

In activity 250, DBMS-agnostic API 206 provides a confirmation to upload API 204, confirming that the key that was persisted in key store 208 in activity 218 has been terminated. The confirmation provided by DBMS-agnostic API 206 and the confirmation received by DBMS-agnostic API 206 from key store 208 may be the same or different. For example, DBMS-agnostic API 206 may forward the confirmation that is received from key store 208 to upload API 204. In another example, DBMS-agnostic API 206 may generate the confirmation that is provided to upload API 204 in response to receipt of the confirmation that is provided to DBMS-agnostic API 206 by key store 208.

In activity 252, upload API 204 provides a confirmation to user device 202, confirming that the key that was persisted in key store 208 in activity 218 has been terminated. The confirmation provided by upload API 204 and the confirmation received by upload API 204 from DBMS-agnostic API 206 may be the same or different. For example, upload API 204 may forward the confirmation that is received from DBMS-agnostic API 206 to user device 202. In another example, upload API 204 may generate the confirmation that is provided to user device 202 in response to receipt of the confirmation that is provided to upload API 204 by DBMS-agnostic API 206.

In some example embodiments, one or more activities 214, 216, 218, 220, 222, 224, 226, 228, 230, 232, 234, 236, 238, 240, 242, 244, 246, 248, 250, and 252 of activity diagram 200 may not be performed. Moreover, activities in addition to or in lieu of activities 214, 216, 218, 220, 222, 224, 226, 228, 230, 232, 234, 236, 238, 240, 242, 244, 246, 248, 250, and 252 may be performed.

Figure 3:
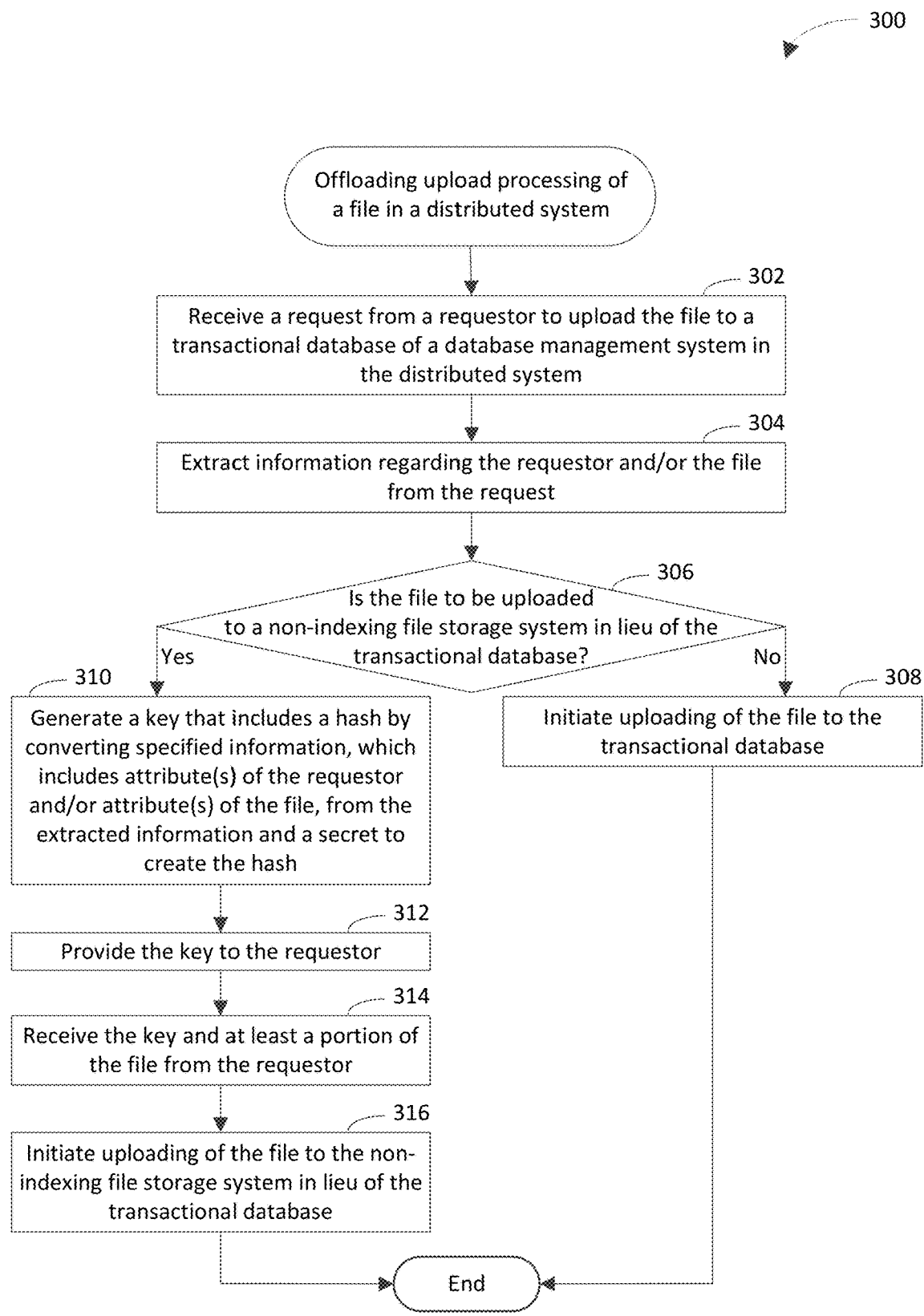
FIG. 3 depicts a flowchart of an example method for offloading upload processing of a file in a distrusted system in accordance with an embodiment.
Figure 4:
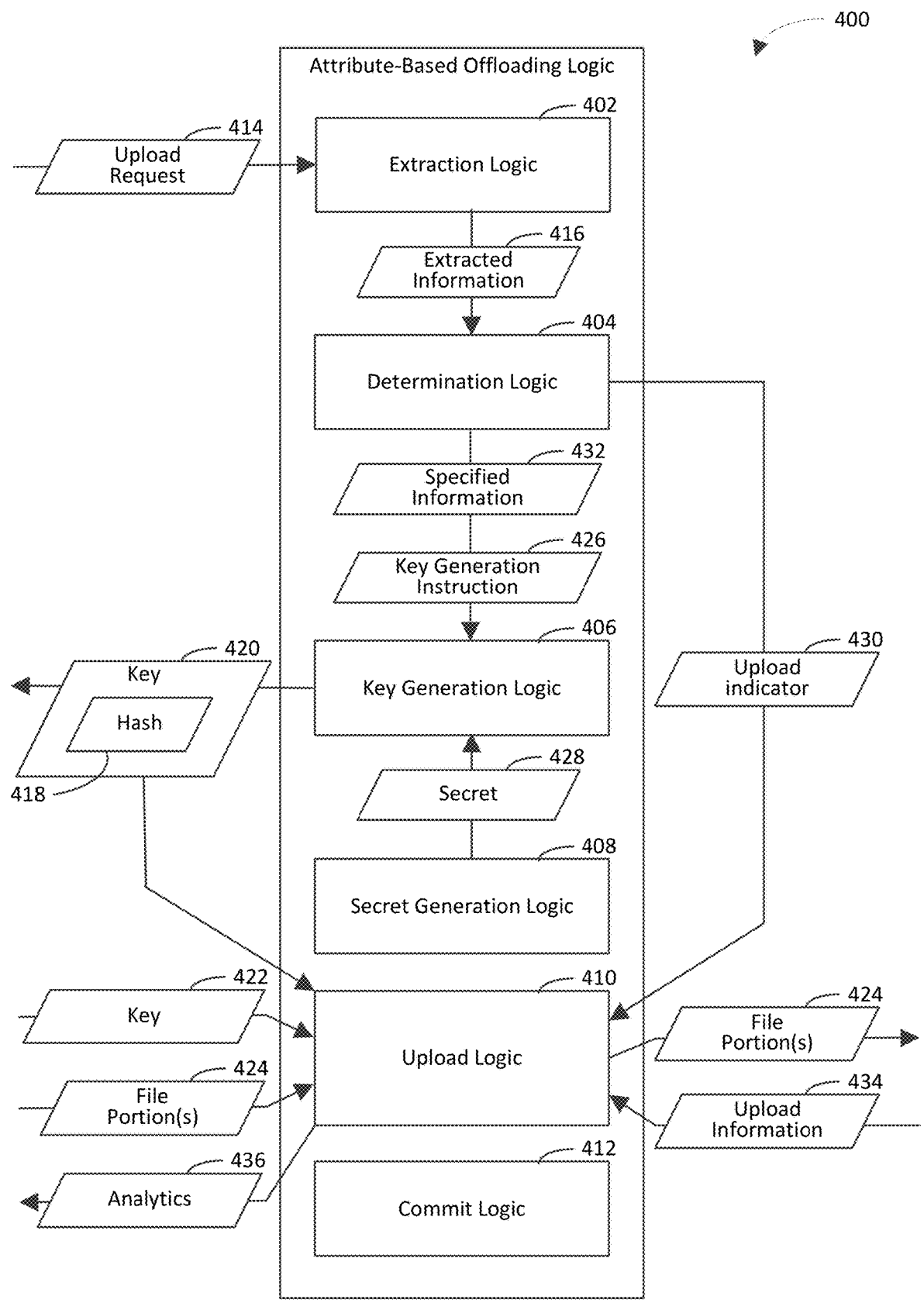
FIG. 4 is a block diagram of an example implementation of attribute-based offloading logic shown in FIG. 1 in accordance with an embodiment.

FIG. 3 depicts a flowchart 300 of an example method for offloading upload processing of a file in a distrusted system in accordance with an embodiment. Flowchart 300 may be performed by attribute-based offloading logic 110 shown in FIG. 1, for example. For illustrative purposes, flowchart 300 is described with respect to attribute-based offloading logic 400 shown in FIG. 4, which is an example implementation of attribute-based offloading logic 110, according to an embodiment. As shown in FIG. 4, attribute-based offloading logic 400 includes extraction logic 402, determination logic 404, key generation logic 406, secret generation logic 408, upload logic 410, and commit logic 412. Further structural and operational embodiments will be apparent to persons skilled in the relevant art(s) based on the discussion regarding flowchart 300.

As shown in FIG. 3, the method of flowchart 300 begins at step 302. In step 302, a request from a requestor to upload the file to a transactional database of a database management system in the distributed system is received. In an example implementation, extraction logic 402 receives an upload request 414, which requests that the file be uploaded to the transactional database.

At step 304, information regarding the requestor and/or the file is extracted from the request. In an example implementation, extraction logic 402 extracts the information from the upload request 414. In accordance with this implementation, extraction logic 402 may provide extracted information 416 to determination logic. The extracted information 416 may include the information that is extracted from the request.

At step 306, a determination is made whether the file is to be uploaded to a non-indexing file storage system in lieu of the transactional database. The determination may be based at least in part on the extracted information satisfying one or more criteria. Examples of such a criterion include but are not limited to a file name of the file and a reference file semantically matching, a type of the file and a reference type being same, a size of the file being greater than or equal to a reference file size, content of the file including (or not including) reference content, an estimated workload associated with uploading the file to the transactional database being greater than or equal to a threshold workload, a location (e.g., folder or store) of the file and a reference location being same (or different), an entity (e.g., case, lead, opportunity, or product) with which the file is associated and a reference entity being same, a credential of the requestor and a reference credential being same, and an organization to which the requestor belongs and a reference organization being same. If the file is to be uploaded to the non-indexing file storage system in lieu of the transactional database, flow continues to step 310. Otherwise, flow continues to step 308.

In an example implementation, determination logic 404 determines whether the file is to be uploaded to the non-indexing file storage system in lieu of the transactional database. In accordance with this implementation, determination logic 404 may generate an upload indicator 430 to indicate whether the file is to be uploaded to the non-indexing file storage system or the transactional database. For instance, determination logic 404 may generate the upload indicator 430 to have a first value if the file is to be uploaded to the non-indexing file storage system. Determination logic 404 may generate the upload indicator 430 to have a second value that is different from the first value if the file is to be uploaded to the transactional database. In further accordance with this implementation, determination logic 404 may generate a key generation instruction 426, which instructs key generation logic 406 to generate a key 420, in response to (e.g., based at least in part on) a determination that the file is to be uploaded to the non-indexing file storage system in lieu of the transactional database. In further accordance with this implementation, determination logic 404 may provide at least some of the extracted information 416 (referred to herein as specified information 432) to key generation logic 426 in response to a determination that the file is to be uploaded to the non-indexing file storage system in lieu of the transactional database. For instance, the specified information 432 may facilitate generation of the key 420 by key generation logic 406.

At step 308, uploading of the file to the transactional database is initiated. Upon completion of step 308, flowchart 300 ends. In an example implementation, upload logic 410 initiates uploading of the file to the transactional database (e.g., in response to receipt of the upload indicator 430). For instance, upload logic 410 may initiate uploading of the file to the transactional database based at least in part on the upload indicator 430 having the second value mentioned above with reference to step 306.

At step 310, a key that includes a hash is generated by converting specified information, which includes attribute(s) of the requestor and/or attribute(s) of the file, from the extracted information and a secret to create the hash. In an example implementation, key generation logic 406 generates the key 420, which includes a hash 418, by converting the specified information 432 from the extracted information 416 and a secret 428 to create the hash 418. In accordance with this implementation, secret generation logic 408 may generate the secret 428.

In an example embodiment, generating the key at step 310 includes generating the key by converting the specified information, which includes a name of the file and/or a size of the file, from the extracted information and the secret to create the hash.

At step 312, the key is provided to the requestor (e.g., based at least in part on a determination that the file is to be uploaded to the non-indexing file storage system in lieu of the transactional database). In an example implementation, key generation logic 046 provides the key 420 to the requestor.

At step 314, the key and at least a portion of the file are received from the requestor. In an example implementation, upload logic 410 receives the key 422 and file portion(s) 424 from the requestor. The file portion(s) 424 include at least the portion of the file.

At step 316, uploading of the file to the non-indexing file storage system in lieu of the transactional database is initiated (e.g., based at least in part on receipt of the key from the requestor). Upon completion of step 316, flowchart 300 ends. In an example implementation, upload logic 410 initiates the uploading of the file to the non-indexing file storage system (e.g., in response to receipt of the upload indicator 430). For instance, upload logic 410 may initiate uploading of the file to the non-indexing file storage system based at least in part on the upload indicator 430 having the first value mentioned above with reference to step 306. In accordance with this implementation, upload logic 410 may initiate the uploading of the file to the non-indexing file storage system further based at least in part on the key 420 and the key 422 matching (e.g., being same). For instance, if the key 420 and the key 422 were not to match, upload logic 410 may not initiate uploading of the file (or at least a portion thereof) to the non-indexing file storage system, and upload logic 410 may delete any portions that were already uploaded to the non-indexing file storage system from the non-indexing file storage system.

In an example embodiment, initiating the uploading of the file at step 316 includes uploading multiple portions of the file in parallel to the non-indexing file storage system in lieu of the transactional database based at least in part on the receipt of the key from the requestor.

In another example embodiment, the non-indexing file storage system is a distributed non-indexing file storage system. In accordance with this embodiment, initiating uploading of the file includes uploading the file in a distributed manner to the distributed non-indexing file storage system.

In yet another example embodiment, initiating the uploading of the file at step 316 includes one or more steps of flowchart 500 shown in FIG. 5, which is discussed in further detail below.

In some example embodiments, one or more steps 302, 304, 306, 308, 310, 312, 314, and/or 316 of flowchart 300 may not be performed. Moreover, steps in addition to or in lieu of steps 302, 304, 306, 308, 310, 312, 314, and/or 316 may be performed. For instance, in an example embodiment, receiving the request at step 302 includes receiving the request at a file upload API of the transactional database. For instance, extraction logic 402, determination logic 404, key generation logic 406, secret generation logic 408, and/or commit logic 412 collectively may include the file upload API. In accordance with this embodiment, generating the key at step 310 includes generating the key by the file upload API. In further accordance with this embodiment, the method of flowchart 300 further includes forwarding the key from the file upload API of the transactional database to a DBMS-agnostic API, which stores the key. In further accordance with this embodiment, the method of flowchart 300 further includes validating the key by the DBMS-agnostic API by confirming that the key was generated by the file upload API. For instance, upload logic 410 may include the DBMS-agnostic API.

In another example embodiment, the method of flowchart 300 further includes providing analytics regarding the file to the requestor as the file is being uploaded to the non-indexing file storage system in lieu of the transactional database. In an example implementation, upload logic 410 provides analytics 436 regarding the file to the requestor as the file is being uploaded to the non-indexing file storage system. For example, upload logic 410 may analyze the file and/or monitor the uploading of the file to determine information that upload logic 410 uses to generate at least some of the analytics. In another example, upload logic 410 receives upload information 434 from the non-indexing file storage system. The upload information 434 includes information determined by the non-indexing file storage system by analyzing the file and/or monitoring the uploading of the file. In accordance with this example, upload logic 410 may generate at least some of the analytics based at least in part on the upload information 434.

The information that is used to generate the analytics 436 may include information regarding a size and/or type of the file, an entity (e.g., case, lead, or opportunity) against which the file is uploaded, a stage of a workflow in which the file is uploaded, etc. The analytics 436 may be specified by the requestor, though the example embodiments are not limited in this respect. For instance, the requestor may choose the analytics 436 to receive from a plurality of predefined analytics.

In yet another example embodiment, initiating the uploading of the file to the non-indexing file storage system includes uploading the file to a storage location in the non-indexing file storage system. In accordance with this embodiment, the method of flowchart 300 further includes committing the file in the non-indexing file storage system. For instance, commit logic 412 may commit the file in the non-indexing file storage system. In further accordance with this embodiment, the method of flowchart 300 further includes providing a pointer (e.g., a link) in the transactional database. The pointer points to the storage location in the non-indexing file storage system. For instance, commit logic 412 may provide the pointer in the transactional database.

In still another example embodiment, the method of flowchart 300 further includes analyzing content of the file to determine whether the content includes disallowed content. Examples of disallowed content may include but are not limited to profane content, illegal content, and malware. For instance, upload logic 410 may analyze the content of the file to determine whether the content includes disallowed content. In accordance with this embodiment, the method of flowchart 300 further includes not committing the file in the non-indexing file storage system based at least in part on the content including the disallowed content. For instance, commit logic 412 may not commit the file in the non-indexing file storage system based at least in part on the content including the disallowed content.

In yet another example embodiment, generating the key at step 310 includes configuring the key to expire after a finite period of time (e.g., five minutes, 30 minutes, an hour, a day, or a month). In accordance with this embodiment, initiating uploading of the file to the non-indexing file storage system at step 316 includes initiating uploading of the file to the non-indexing file storage system in lieu of the transactional database based at least in part on receipt of the key from the requestor within the finite period of time. In further accordance with this embodiment, the method of flowchart 300 may further include terminating the key in response to passage of the finite period of time. For instance, upload logic 410 may terminate the key in response to passage of the finite period of time.

In an aspect of this embodiment, steps 314 and 316 of flowchart 300 may be replaced by one or more steps of flowchart 600 shown in FIG. 6, which is discussed in further detail below.

It will be recognized that attribute-based offloading logic 400 may not include one or more of extraction logic 402, determination logic 404, key generation logic 406, secret generation logic 408, upload logic 410, and/or commit logic 412. Furthermore, attribute-based offloading logic 400 may include components in addition to or in lieu of extraction logic 402, determination logic 404, key generation logic 406, secret generation logic 408, upload logic 410, and/or commit logic 412.

Figure 5:
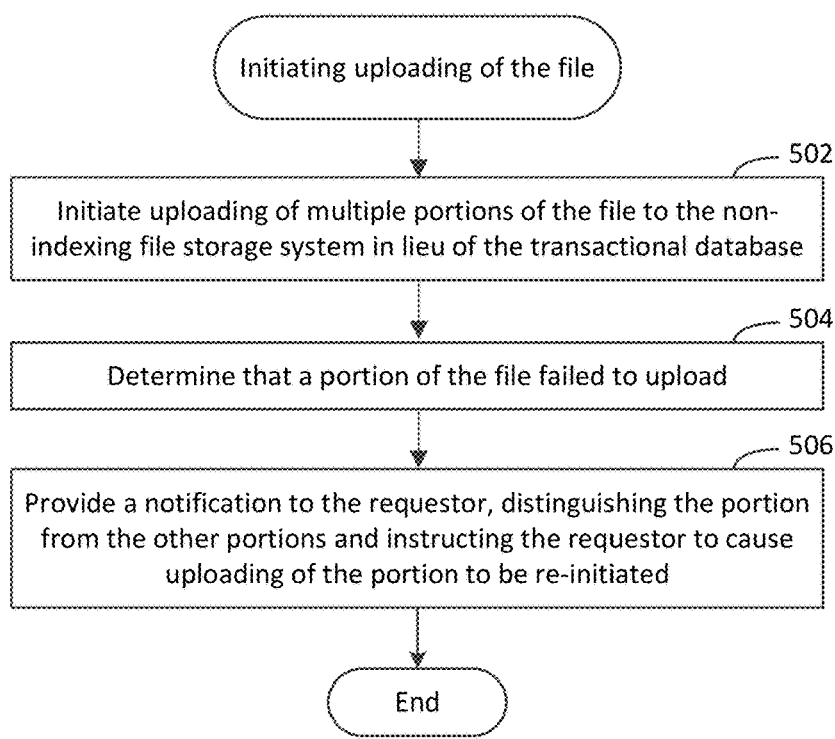
FIG. 5 depicts a flowchart of an example method for initiating uploading of a file in accordance with an embodiment.

FIG. 5 depicts a flowchart 500 of an example method for initiating uploading of a file in accordance with an embodiment. FIG. 6 depicts a flowchart 600 of another example method for offloading upload processing of a file in a distrusted system in accordance with an embodiment. Flowcharts 500 and 600 may be performed by upload logic 410 shown in FIG. 4, for example. For illustrative purposes, flowcharts 500 and 600 are described with respect to upload logic 700 shown in FIG. 7, which is an example implementation of upload logic 410, according to an embodiment. As shown in FIG. 7, upload logic 700 includes storing logic 702, validation logic 704, initiation logic 706, and notification logic 708. Further structural and operational embodiments will be apparent to persons skilled in the relevant art(s) based on the discussion regarding flowcharts 500 and 600.

As shown in FIG. 5, the method of flowchart 500 begins at step 502. In step 502, uploading of multiple portions of the file to the non-indexing file storage system in lieu of the transactional database is initiated. In an example implementation, initiation logic 706 initiates uploading of file portion(s) 724 to the non-indexing file storage system in lieu of the transactional database.

At step 504, a determination is made that a portion of the file failed to upload. In an example implementation, notification logic 708 determines that the portion of the file failed to upload. For instance, notification logic 708 may receive an upload status indicator 742 from the non-indexing file storage system. The upload status indicator 742 may specify whether any one or more (e.g., each) of the file portion(s) 724 have successfully uploaded. For example, the upload status indicator 742 may indicate that the portion failed to upload. It should be noted that the upload status indicator 742 may be included in the upload information 434 shown in FIG. 4.

At step 506, a notification is provided to the requestor (e.g., based at least in part on the portion failing to upload). The notification distinguishes the portion from the other portions and instructs the requestor to cause uploading of the portion to be re-initiated. In an example implementation, notification logic 708 provides notification 744 to the requestor. In accordance with this implementation, notification 744 distinguishes the portion from the other portions and instructs the requestor to cause the uploading of the portion to be re-initiated. It should be noted that the notification 744 may be included in the analytics 436 shown in FIG. 4.

Figure 6:
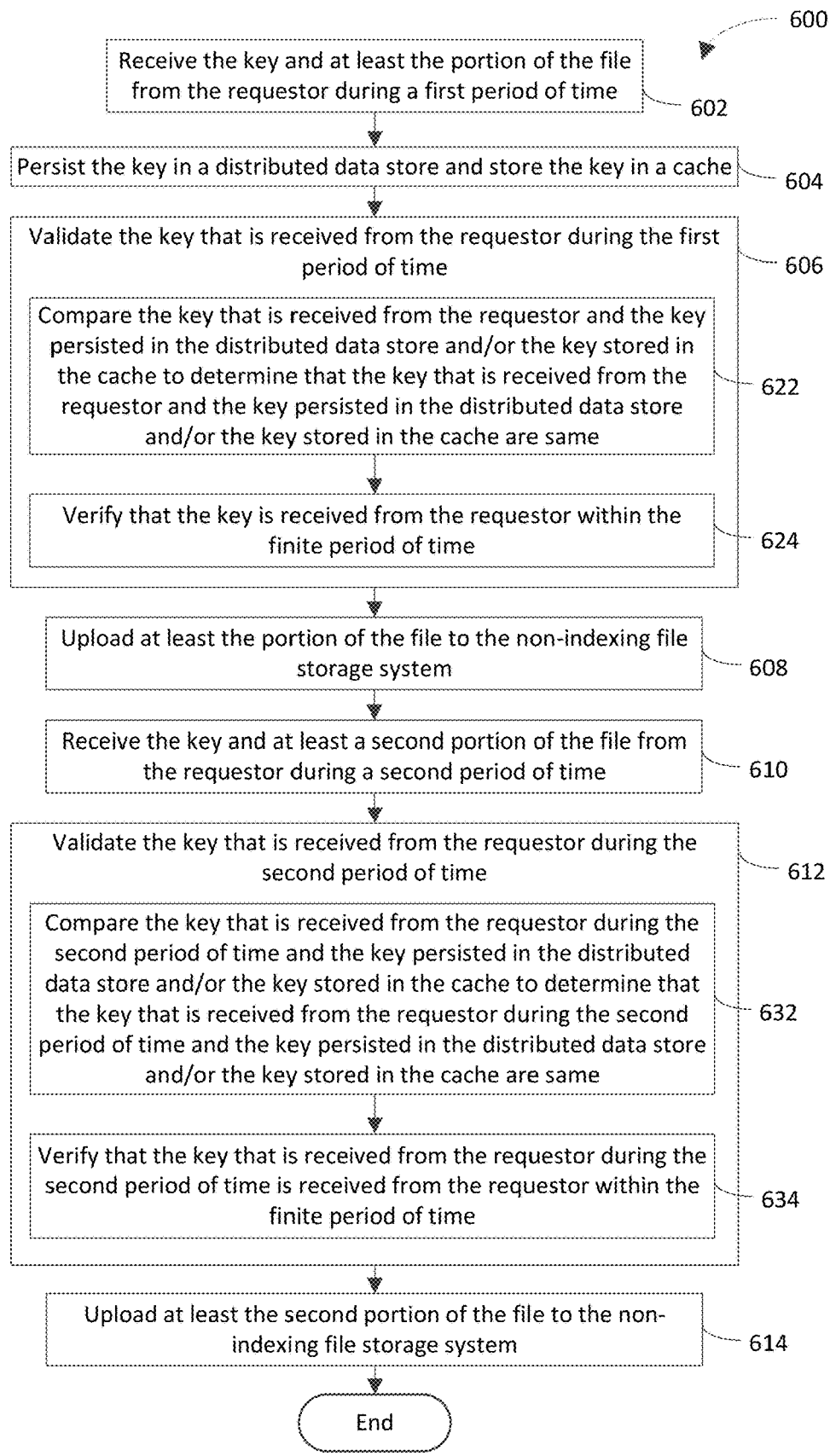
FIG. 6 depicts a flowchart of another example method for offloading upload processing of a file in a distrusted system in accordance with an embodiment.
Figure 7:
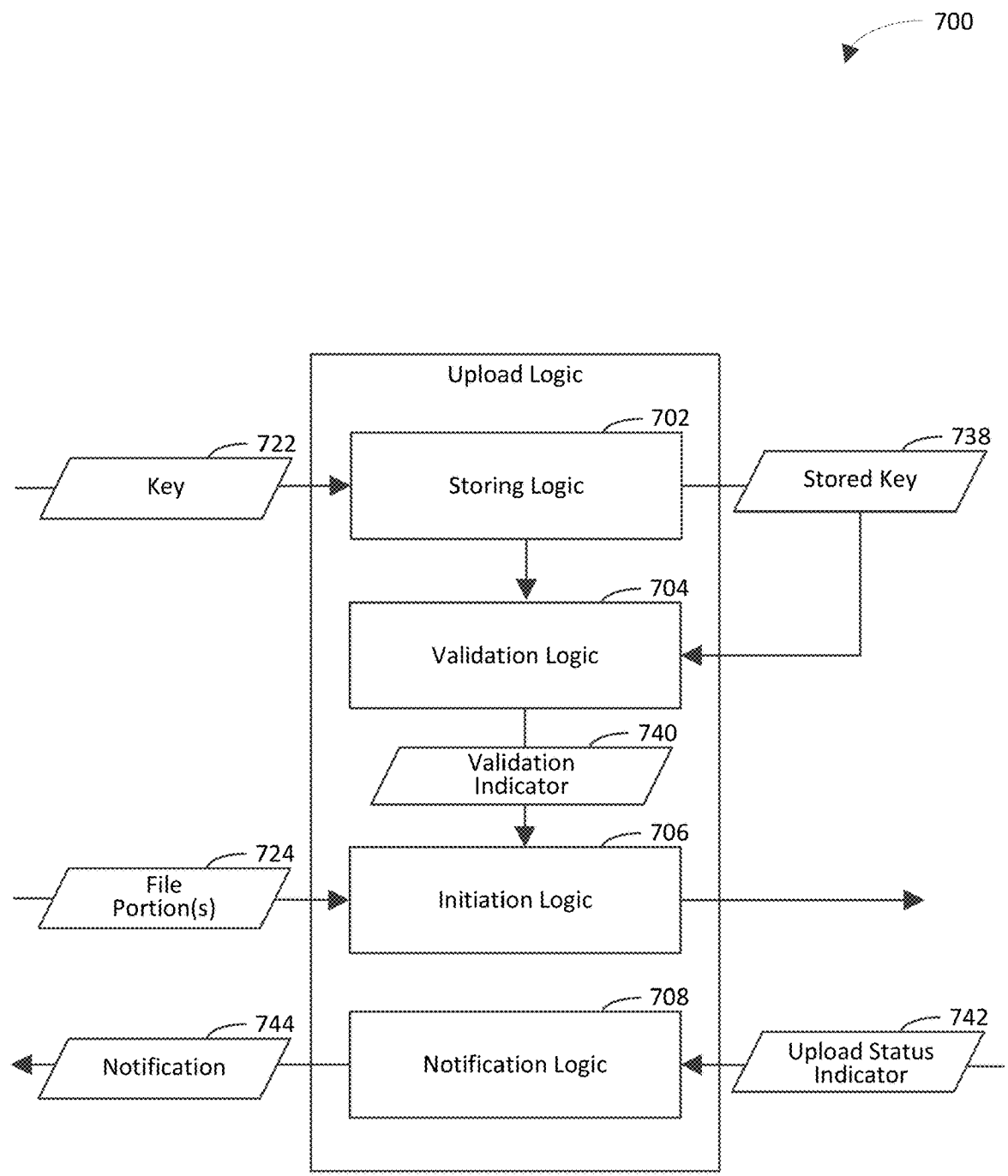
FIG. 7 is a block diagram of an example implementation of upload logic shown in FIG. 4 in accordance with an embodiment.

As shown in FIG. 6, the method of flowchart 600 begins at step 602. In step 602, the key and at least the portion of the file are received from the requestor during a first period of time. In an example implementation, storing logic 702 receives key 722 from the requestor during the first period of time. In accordance with this implementation, initiation logic 706 receives at least the portion of the file from the requestor during the first period of time. For instance, at least the portion of the file may be included in file portions(s) 724.

At step 604, the key is persisted in a distributed data store, and the key is stored in a cache. In an example implementation, storing logic 702 persists the key 722 in a distributed data store and stores the key 722 in the cache to provide stored key 738.

At step 606, the key that is received from the requestor during the first period of time is validated. In an example implementation, validation logic 704 validates the key 722 that is received from the requestor during the first period of time. In accordance with this implementation, validation logic 704 may generate a validation indicator 740 in response to validating the key 722. For instance, the validation indicator 740 may indicate (e.g., specify) that the key 722 that is received from the requestor during the first period of time is validated.

Step 606 includes sub-steps 622 and 624. At sub-step 622, the key that is received from the requestor and the key persisted in the distributed data store and/or the key stored in the cache are compared to determine that the key that is received from the requestor and the key persisted in the distributed data store and/or the key stored in the cache are same. In an example implementation, validation logic 704 compares the key 722 that is received from the requestor during the first period of time and the stored key 738 to determine that the key 722 and the stored key 738 are same. At sub-step 624, a verification is made that the key is received from the requestor within the finite period of time. In an example implementation, validation logic 704 verifies that the key 722 is received from the requestor within the finite period of time.

At step 608, at least the portion of the file is uploaded to the non-indexing file storage system (e.g., based at least in part on validation of the key that is received from the requestor during the first period of time). In an example implementation, initiation logic 706 uploads at least the portion of the file to the non-indexing file storage system.

At step 610, the key and at least a second portion of the file are received from the requestor during a second period of time. In an example implementation, storing logic 702 receives key 722 from the requestor during the second period of time. In accordance with this implementation, initiation logic 706 receives at least the second portion of the file from the requestor during the second period of time. For instance, at least the second portion of the file may be included in file portions(s) 724.

At step 612, the key that is received from the requestor during the second period of time is validated. In an example implementation, validation logic 704 validates the key 722 that is received from the requestor during the second period of time. In accordance with this implementation, validation logic 704 may again generate the validation indicator 740 in response to validating the key 722. For instance, the validation indicator 740 may indicate that the key 722 that is received from the requestor during the second period of time is validated.

Step 612 includes sub-steps 632 and 634. At sub-step 632, the key that is received from the requestor during the second period of time and the key persisted in the distributed data store and/or the key stored in the cache are compared to determine that the key that is received from the requestor during the second period of time and the key persisted in the distributed data store and/or the key stored in the cache are same. In an example implementation, validation logic 704 compares the key 722 that is received from the requestor during the second period of time and the stored key 738 to determine that the key 722 and the stored key 738 are same. At sub-step 634, a verification is made that the key that is received from the requestor during the second period of time is received from the requestor within the finite period of time. In an example implementation, validation logic 704 verifies that the key 722 is received from the requestor within the finite period of time.

At step 614, at least the second portion of the file is uploaded to the non-indexing file storage system (e.g., based at least in part on validation of the key that is received from the requestor during the second period of time). In an example implementation, initiation logic 706 uploads at least the second portion of the file to the non-indexing file storage system.

It will be recognized that upload logic 700 may not include one or more of storing logic 702, validation logic 704, initiation logic 706, and/or notification logic 708. Furthermore, upload logic 700 may include components in addition to or in lieu of storing logic 702, validation logic 704, initiation logic 706, and/or notification logic 708.

Any one or more of transactional database 108, attribute-based offloading logic 110, non-indexing file storage system 112, key store 208, non-indexing file storage system 212, attribute-based offloading logic 400, extraction logic 402, determination logic 404, key generation logic 406, secret generation logic 408, upload logic 410, commit logic 412, upload logic 700, storing logic 702, validation logic 704, initiation logic 706, notification logic 708, activity diagram 200, flowchart 300, flowchart 500, and/or flowchart 600 may be implemented in hardware, software, firmware, or any combination thereof.

For example, any one or more of transactional database 108, attribute-based offloading logic 110, non-indexing file storage system 112, key store 208, non-indexing file storage system 212, attribute-based offloading logic 400, extraction logic 402, determination logic 404, key generation logic 406, secret generation logic 408, upload logic 410, commit logic 412, upload logic 700, storing logic 702, validation logic 704, initiation logic 706, notification logic 708, activity diagram 200, flowchart 300, flowchart 500, and/or flowchart 600 may be implemented, at least in part, as computer program code configured to be executed in one or more processors.

In another example, any one or more of transactional database 108, attribute-based offloading logic 110, non-indexing file storage system 112, key store 208, non-indexing file storage system 212, attribute-based offloading logic 400, extraction logic 402, determination logic 404, key generation logic 406, secret generation logic 408, upload logic 410, commit logic 412, upload logic 700, storing logic 702, validation logic 704, initiation logic 706, notification logic 708, activity diagram 200, flowchart 300, flowchart 500, and/or flowchart 600 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

An example system to offload upload processing of a file in a distributed system comprises memory and one or more processors coupled to the memory. The one or more processors are configured to extract information regarding at least one of a requestor or the file from a request that is received from the requestor. The request requests upload of the file to a transactional database of a database management system in the distributed system. The one or more processors are further configured to determine that the file is to be uploaded to a non-indexing file storage system in lieu of the transactional database based at least in part on the extracted information satisfying one or more criteria. The one or more processors are further configured to generate a key that includes a hash by converting specified information, which includes at least one of (1) at least one attribute of the requestor or (2) at least one attribute of the file, from the extracted information and a secret to create the hash. The one or more processors are further configured to provide the key to the requestor based at least in part on a determination that the file is to be uploaded to the non-indexing file storage system in lieu of the transactional database. The one or more processors are further configured to initiate uploading of the file to the non-indexing file storage system in lieu of the transactional database based at least in part on receipt of the key and at least a portion of the file from the requestor.

In a first aspect of the example system, the one or more processors are configured to determine that the file is to be uploaded to the non-indexing file storage system in lieu of the transactional database based at least in part on at least one of the following: a file name of the file and a reference file semantically matching; a type of the file and a reference type being same; a size of the file being greater than or equal to a reference file size; content of the file including reference content; content of the file including a reference type of content; an estimated workload associated with uploading the file to the transactional database being greater than or equal to a threshold workload; a location of the file and a reference location being same.

In a second aspect of the example system, the one or more processors are configured to determine that the file is to be uploaded to the non-indexing file storage system in lieu of the transactional database based at least in part on at least one of the following: an entity with which the file is associated and a reference entity being same; a credential of the requestor and a reference credential being same; an organization to which the requestor belongs and a reference entity being same. The second aspect of the example system may be implemented in combination with the first aspect of the example system, though the example embodiments are not limited in this respect.

In a third aspect of the example system, the one or more processors are configured to generate the key by converting the specified information, which includes at least one of a name of the file or a size of the file, from the extracted information and the secret to create the hash. The third aspect of the example system may be implemented in combination with the first and/or second aspect of the example system, though the example embodiments are not limited in this respect.

In a fourth aspect of the example system, the one or more processors are configured to execute a file upload API of the transactional database and a DBMS-agnostic API. In accordance with the fourth aspect, the file upload API is configured to generate the key based at least in part on receipt of the request. In further accordance with the fourth aspect, the file upload API is configured to forward the key to the DBMS-agnostic API. In further accordance with the fourth aspect, the DBMS-agnostic API is configured to store the key and validate the key by confirming that the key was generated by the file upload API. The fourth aspect of the example system may be implemented in combination with the first, second, and/or third aspect of the example system, though the example embodiments are not limited in this respect.

In a fifth aspect of the example system, the one or more processors are configured to configure the key to expire after a finite period of time. In accordance with the fifth aspect, the one or more processors are configured to initiate uploading of the file to the non-indexing file storage system in lieu of the transactional database based at least in part on receipt of the key from the requestor within the finite period of time. The fifth aspect of the example system may be implemented in combination with the first, second, third, and/or fourth aspect of the example system, though the example embodiments are not limited in this respect.

In an example of the fifth aspect, the one or more processors are configured to persist the key in a distributed data store and store the key in a cache. In accordance with this example, the one or more processors are configured to validate the key that is received from the requestor by (1) comparing the key that is received from the requestor and at least one of the key persisted in the distributed data store or the key stored in the cache to determine that the key that is received from the requestor and the at least one of the key persisted in the distributed data store or the key stored in the cache are same and (2) verifying that the key is received from the requestor within the finite period of time. In further accordance with this example, the one or more processors are configured to upload at least the portion of the file to the non-indexing file storage system based at least in part on validation of the key that is received from the requestor.

In an implementation of this example of the fifth aspect, the one or more processors are configured to initiate the uploading of the file to the non-indexing file storage system in lieu of the transactional database based at least in part on the receipt of the key and at least the portion of the file from the requestor during a first period of time. In accordance with this implementation, the one or more processors are configured to validate the key that is received from the requestor during a second period of time that is subsequent to the first period of time based at least in part on receipt of the key and at least a second portion of the file from the requestor during the second period of time by (1) comparing the key that is received from the requestor during the second period of time and at least one of the key persisted in the distributed data store or the key stored in the cache to determine that the key that is received from the requestor during the second period of time and the at least one of the key persisted in the distributed data store or the key stored in the cache are same and (2) verifying that the key that is received from the requestor during the second period of time is received from the requestor within the finite period of time. In further accordance with this implementation, the one or more processors are configured to upload at least the second portion of the file to the non-indexing file storage system based at least in part on validation of the key that is received from the requestor during the second period of time.

In a sixth aspect of the example system, the one or more processors are configured to upload the file to a storage location in the non-indexing file storage system. In accordance with the sixth aspect, the one or more processors are configured to commit the file in the non-indexing file storage system. In further accordance with the sixth aspect, the one or more processors are configured to provide a pointer in the transactional database, the pointer pointing to the storage location in the non-indexing file storage system. The sixth aspect of the example system may be implemented in combination with the first, second, third, fourth, and/or fifth aspect of the example system, though the example embodiments are not limited in this respect.

In a seventh aspect of the example system, the one or more processors are configured to analyze content of the file to determine whether the content includes disallowed content. In accordance with the seventh aspect, the one or more processors are configured to not commit the file in the non-indexing file storage system based at least in part on the content including the disallowed content. The seventh aspect of the example system may be implemented in combination with the first, second, third, fourth, fifth, and/or sixth aspect of the example system, though the example embodiments are not limited in this respect.

In an eighth aspect of the example system, the one or more processors are configured to upload a plurality of portions of the file in parallel to the non-indexing file storage system in lieu of the transactional database based at least in part on the receipt of the key from the requestor. The eighth aspect of the example system may be implemented in combination with the first, second, third, fourth, fifth, sixth, and/or seventh aspect of the example system, though the example embodiments are not limited in this respect.

In a ninth aspect of the example system, the one or more processors are configured to initiate uploading of a plurality of portions of the file to the non-indexing file storage system in lieu of the transactional database. In accordance with the ninth aspect, the one or more processors are configured to determine whether a portion of the plurality of portions failed to upload. In further accordance with the ninth aspect, the one or more processors are configured to provide a notification to the requestor based at least in part on the portion failing to upload. The notification distinguishes the portion from the other portions and instructs the requestor to cause uploading of the portion to be re-initiated. The ninth aspect of the example system may be implemented in combination with the first, second, third, fourth, fifth, sixth, seventh, and/or eighth aspect of the example system, though the example embodiments are not limited in this respect.

In a tenth aspect of the example system, the non-indexing file storage system is a distributed non-indexing file storage system. In accordance with the tenth aspect, the one or more processors are configured to upload the file in a distributed manner to the distributed non-indexing file storage system. The tenth aspect of the example system may be implemented in combination with the first, second, third, fourth, fifth, sixth, seventh, eighth, and/or ninth aspect of the example system, though the example embodiments are not limited in this respect.

In an eleventh aspect of the example system, the one or more processors are configured to provide analytics regarding the file to the requestor as the file is being uploaded to the non-indexing file storage system in lieu of the transactional database. The eleventh aspect of the example system may be implemented in combination with the first, second, third, fourth, fifth, sixth, seventh, eighth, ninth, and/or tenth aspect of the example system, though the example embodiments are not limited in this respect.

In an example method of offloading upload processing of a file in a distributed system, a request to upload the file to a transactional database of a database management system in the distributed system is received from a requestor. Information regarding at least one of the requestor or the file is extracted from the request. A determination is made that the file is to be uploaded to a non-indexing file storage system in lieu of the transactional database based at least in part on the extracted information satisfying one or more criteria. A key that includes a hash is generated by converting specified information, which includes at least one of (1) at least one attribute of the requestor or (2) at least one attribute of the file, from the extracted information and a secret to create the hash. The key is provided to the requestor based at least in part on a determination that the file is to be uploaded to the non-indexing file storage system in lieu of the transactional database. The key and at least a portion of the file are received from the requestor. Uploading of the file to the non-indexing file storage system in lieu of the transactional database is initiated based at least in part on receipt of the key from the requestor.

In a first aspect of the example method, determining that the file is to be uploaded to the non-indexing file storage system comprises determining that the file is to be uploaded to the non-indexing file storage system in lieu of the transactional database based at least in part on at least one of the following: a file name of the file and a reference file semantically matching; a type of the file and a reference type being same; a size of the file being greater than or equal to a reference file size; content of the file including reference content; content of the file including a reference type of content; an estimated workload associated with uploading the file to the transactional database being greater than or equal to a threshold workload; a location of the file and a reference location being same.

In a second aspect of the example method, determining that the file is to be uploaded to the non-indexing file storage system comprises determining that the file is to be uploaded to the non-indexing file storage system in lieu of the transactional database based at least in part on at least one of the following: an entity with which the file is associated and a reference entity being same; a credential of the requestor and a reference credential being same; an organization to which the requestor belongs and a reference entity being same. The second aspect of the example method may be implemented in combination with the first aspect of the example method, though the example embodiments are not limited in this respect.

In a third aspect of the example method, generating the key comprises generating the key by converting the specified information, which includes at least one of a name of the file or a size of the file, from the extracted information and the secret to create the hash. The third aspect of the example method may be implemented in combination with the first and/or second aspect of the example method, though the example embodiments are not limited in this respect.

In a fourth aspect of the example method, receiving the request comprises receiving the request at a file upload API of the transactional database. In accordance with the fourth aspect, generating the key comprises generating the key by the file upload API. In further accordance with the fourth aspect, the example method further comprises forwarding the key from the file upload API of the transactional database to a DBMS-agnostic API, which stores the key. In further accordance with the fourth aspect, the example method further comprises validating the key by the DBMS-agnostic API by confirming that the key was generated by the file upload API. The fourth aspect of the example method may be implemented in combination with the first, second, and/or third aspect of the example method, though the example embodiments are not limited in this respect.

In a fifth aspect of the example method, generating the key comprises configuring the key to expire after a finite period of time. In accordance with the fifth aspect, initiating uploading of the file comprises initiating uploading of the file to the non-indexing file storage system in lieu of the transactional database based at least in part on receipt of the key from the requestor within the finite period of time. The fifth aspect of the example method may be implemented in combination with the first, second, third, and/or fourth aspect of the example method, though the example embodiments are not limited in this respect.

In an example of the fifth aspect, the example method further comprises persisting the key in a distributed data store and storing the key in a cache. In accordance with this example, the example method further comprises validating the key that is received from the requestor. In further accordance with this example, the validating comprises comparing the key that is received from the requestor and at least one of the key persisted in the distributed data store or the key stored in the cache to determine that the key that is received from the requestor and the at least one of the key persisted in the distributed data store or the key stored in the cache are same. In further accordance with this example, the validating further comprises verifying that the key is received from the requestor within the finite period of time. In further accordance with this example, initiating the uploading of the file comprises uploading at least the portion of the file to the non-indexing file storage system based at least in part on validation of the key that is received from the requestor.

In an implementation of this example of the fifth aspect, receiving the key and at least the portion of the file from the requestor comprises receiving the key and at least the portion of the file from the requestor during a first period of time. In accordance with this implementation, the example method further comprises receiving the key and at least a second portion of the file from the requestor during a second period of time that is subsequent to the first period of time. In further accordance with this implementation, the example method further comprises validating the key that is received from the requestor during the second period of time. In further accordance with this implementation, the validating comprises comparing the key that is received from the requestor during the second period of time and at least one of the key persisted in the distributed data store or the key stored in the cache to determine that the key that is received from the requestor during the second period of time and at least one of the key persisted in the distributed data store or the key stored in the cache are same. In further accordance with this implementation, the validating further comprises verifying that the key that is received from the requestor during the second period of time is received from the requestor within the finite period of time. In further accordance with this implementation, the example method further comprises uploading at least the second portion of the file to the non-indexing file storage system based at least in part on validation of the key that is received from the requestor during the second period of time.

In a sixth aspect of the example method, initiating the uploading of the file comprises uploading the file to a storage location in the non-indexing file storage system. In accordance with the sixth aspect, the example method further comprises committing the file in the non-indexing file storage system. In further accordance with the sixth aspect, the example method further comprises providing a pointer in the transactional database. In further accordance with the sixth aspect, the pointer points to the storage location in the non-indexing file storage system. The sixth aspect of the example method may be implemented in combination with the first, second, third, fourth, and/or fifth aspect of the example method, though the example embodiments are not limited in this respect.

In a seventh aspect of the example method, the example method further comprises analyzing content of the file to determine whether the content includes disallowed content. In accordance with the seventh aspect, the example method further comprises not committing the file in the non-indexing file storage system based at least in part on the content including the disallowed content. The seventh aspect of the example method may be implemented in combination with the first, second, third, fourth, fifth, and/or sixth aspect of the example method, though the example embodiments are not limited in this respect.

In an eighth aspect of the example method, initiating the uploading of the file comprises uploading a plurality of portions of the file in parallel to the non-indexing file storage system in lieu of the transactional database based at least in part on the receipt of the key from the requestor. The eighth aspect of the example method may be implemented in combination with the first, second, third, fourth, fifth, sixth, and/or seventh aspect of the example method, though the example embodiments are not limited in this respect.

In a ninth aspect of the example method, initiating the uploading of the file comprises initiating uploading of a plurality of portions of the file to the non-indexing file storage system in lieu of the transactional database. In accordance with the ninth aspect, initiating the uploading of the file further comprises determining that a portion of the plurality of portions failed to upload. In further accordance with the ninth aspect, initiating the uploading of the file further comprises providing a notification to the requestor based at least in part on the portion failing to upload, the notification distinguishing the portion from the other portions and instructing the requestor to cause uploading of the portion to be re-initiated. The ninth aspect of the example method may be implemented in combination with the first, second, third, fourth, fifth, sixth, seventh, and/or eighth aspect of the example method, though the example embodiments are not limited in this respect.

In a tenth aspect of the example method, the non-indexing file storage system is a distributed non-indexing file storage system. In accordance with the tenth aspect, initiating uploading of the file comprises uploading the file in a distributed manner to the distributed non-indexing file storage system. The tenth aspect of the example method may be implemented in combination with the first, second, third, fourth, fifth, sixth, seventh, eighth, and/or ninth aspect of the example method, though the example embodiments are not limited in this respect.

In an eleventh aspect of the example method, the example method further comprises providing analytics regarding the file to the requestor as the file is being uploaded to the non-indexing file storage system in lieu of the transactional database. The eleventh aspect of the example method may be implemented in combination with the first, second, third, fourth, fifth, sixth, seventh, eighth, ninth, and/or tenth aspect of the example method, though the example embodiments are not limited in this respect.

An example computer program product comprises a computer-readable storage medium having instructions recorded thereon for enabling a processor-based system to perform operations to offload upload processing of a file in a distributed system. The operations comprise extract information regarding at least one of a requestor or the file from a request that is received from the requestor, the request requesting upload of the file to a transactional database of a database management system in the distributed system. The operations further comprise determine that the file is to be uploaded to a non-indexing file storage system in lieu of the transactional database based at least in part on the extracted information satisfying one or more criteria. The operations further comprise generate a key that includes a hash by converting specified information, which includes at least one of (1) at least one attribute of the requestor or (2) at least one attribute of the file, from the extracted information and a secret to create the hash. The operations further comprise provide the key to the requestor based at least in part on a determination that the file is to be uploaded to the non-indexing file storage system in lieu of the transactional database. The operations further comprise initiate uploading of the file to the non-indexing file storage system in lieu of the transactional database based at least in part on receipt of the key and at least a portion of the file from the requestor.

IV. Example Computer System

Figure 8:
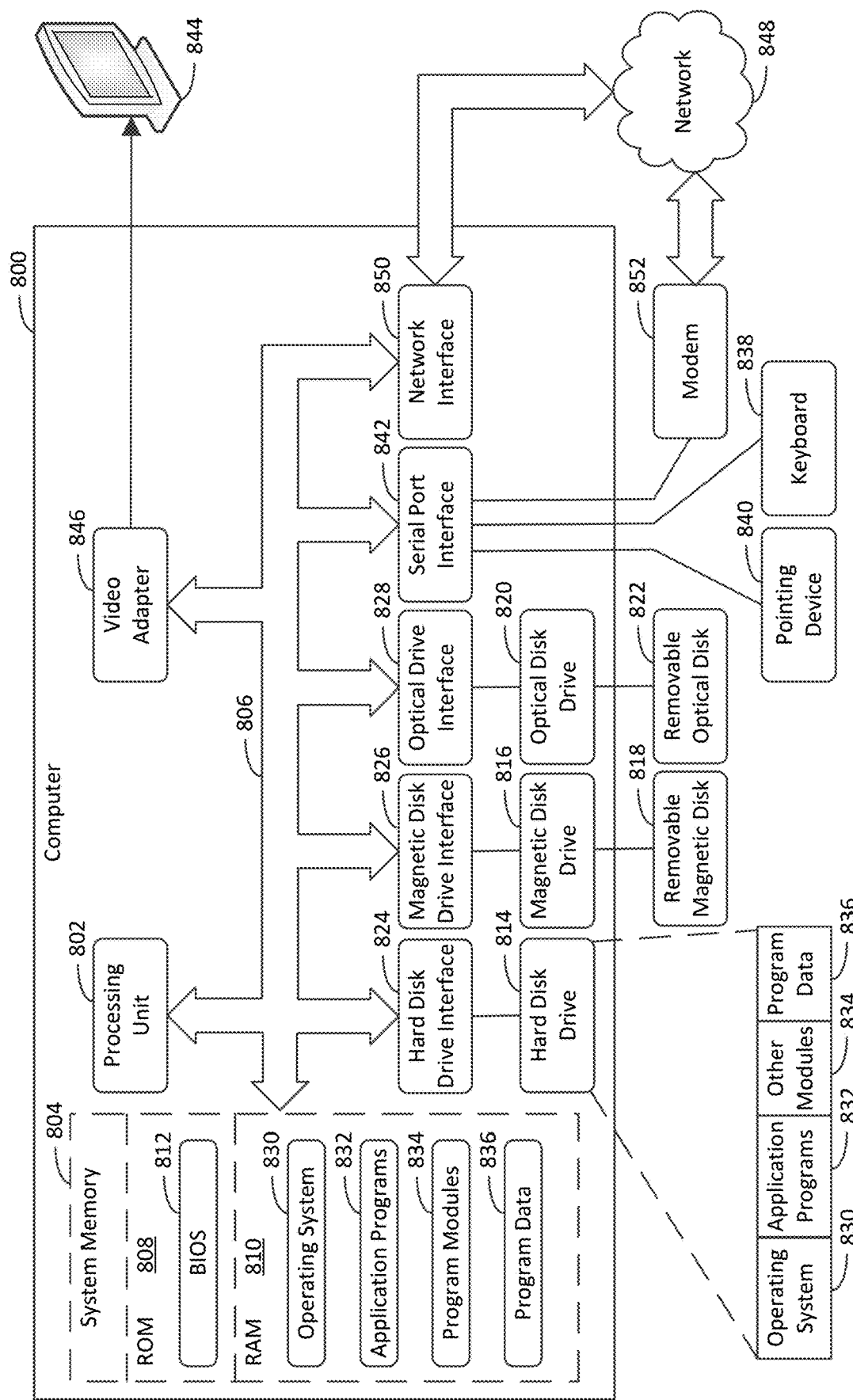
FIG. 8 depicts an example computer in which embodiments may be implemented.

FIG. 8 depicts an example computer 800 in which embodiments may be implemented. Any one or more of client devices 102A-102M, any one or more of servers 106A-106N, and/or attribute-based offloading logic 110 shown in FIG. 1; and/or user device 202 shown in FIG. 2 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of attribute-based offloading logic 110, upload API 204, DBMS-agnostic API 206, key store 208, offload API 210, non-indexing file storage system 212, attribute-based offloading logic 400, extraction logic 402, determination logic 404, key generation logic 406, secret generation logic 408, upload logic 410, commit logic 412, upload logic 700, storing logic 702, validation logic 704, initiation logic 706, notification logic 708, activity diagram 200 (including any activity of activity diagram 200), flowchart 300 (including any step of flowchart 300), flowchart 500 (including any step of flowchart 500), and/or flowchart 600 (including any step of flowchart 600), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:
1. A system to offload upload processing of a file in a distributed system, the system comprising:
 memory; and
 one or more processors coupled to the memory, the one or more processors configured to:
  extract information, which includes at least one of (1) a size of the file, (2) a credential of a user, or (3) an entity to which the user belongs, from a request that is received from the user, the request requesting upload of the file to a transactional database of a database management system in the distributed system;
  determine that the file is to be uploaded to a non-indexing file storage system in lieu of the transactional database based at least in part on the at least one of (1) the size of the file, (2) the credential of the user, or (3) the entity to which the user belongs satisfying one or more criteria;
generate a key that includes a hash by converting specified information, which includes the at least one of (1) the size of the file, (2) the credential of the user, or (3) the entity to which the user belongs, from the extracted information and a secret to create the hash;
provide the key to the user based at least in part on a determination that the file is to be uploaded to the non-indexing file storage system in lieu of the transactional database; and
initiate uploading of the file to the non-indexing file storage system in lieu of the transactional database based at least in part on receipt of the key and at least a portion of the file from the user.

2. The system of claim 1, wherein the one or more processors are configured to:
determine that the file is to be uploaded to the non-indexing file storage system in lieu of the transactional database based at least in part on the size of the file being greater than or equal to a reference file size.

3. The system of claim 1, wherein the one or more processors are configured to:
determine that the file is to be uploaded to the non-indexing file storage system in lieu of the transactional database based at least in part on the credential of the user and a reference credential being same.

4. The system of claim 1, wherein the one or more processors are configured to execute a file upload application programming interface (API) of the transactional database and a database management system-agnostic (DBMS-agnostic) API;
wherein the file upload API is configured to:
generate the key based at least in part on receipt of the request; and
forward the key to the DBMS-agnostic API; and
wherein the DBMS-agnostic API is configured to:
store the key; and
validate the key by confirming that the key was generated by the file upload API.

5. The system of claim 1, wherein the one or more processors are configured to:
configure the key to expire after a finite period of time; and
initiate uploading of the file to the non-indexing file storage system in lieu of the transactional database based at least in part on receipt of the key from the user within the finite period of time.

6. The system of claim 5, wherein the one or more processors are configured to:
persist the key in a distributed data store and store the key in a cache;
validate the key that is received from the user by (1) comparing the key that is received from the user and at least one of the key persisted in the distributed data store or the key stored in the cache to determine that the key that is received from the user and the at least one of the key persisted in the distributed data store or the key stored in the cache are same and (2) verifying that the key is received from the user within the finite period of time; and
upload at least the portion of the file to the non-indexing file storage system based at least in part on validation of the key that is received from the user.

7. The system of claim 6, wherein the one or more processors are configured to:

initiate the uploading of the file to the non-indexing file storage system in lieu of the transactional database based at least in part on the receipt of the key and at least the portion of the file from the user during a first period of time;
validate the key that is received from the user during a second period of time that is subsequent to the first period of time based at least in part on receipt of the key and at least a second portion of the file from the user during the second period of time by (1) comparing the key that is received from the user during the second period of time and at least one of the key persisted in the distributed data store or the key stored in the cache to determine that the key that is received from the user during the second period of time and the at least one of the key persisted in the distributed data store or the key stored in the cache are same and (2) verifying that the key that is received from the user during the second period of time is received from the user within the finite period of time; and
upload at least the second portion of the file to the non-indexing file storage system based at least in part on validation of the key that is received from the user during the second period of time.

8. The system of claim 1, wherein the one or more processors are configured to:
upload the file to a storage location in the non-indexing file storage system;
commit the file in the non-indexing file storage system; and
provide a pointer in the transactional database, the pointer pointing to the storage location in the non-indexing file storage system.

9. The system of claim 1, wherein the one or more processors are configured to:
analyze content of the file to determine whether the content includes disallowed content; and
not commit the file in the non-indexing file storage system based at least in part on the content including the disallowed content.

10. The system of claim 1, wherein the one or more processors are configured to:
upload a plurality of portions of the file in parallel to the non-indexing file storage system in lieu of the transactional database based at least in part on the receipt of the key from the user.

11. The system of claim 1, wherein the one or more processors are configured to:
initiate uploading of a plurality of portions of the file to the non-indexing file storage system in lieu of the transactional database;
determine whether a portion of the plurality of portions failed to upload; and
provide a notification to the user based at least in part on the portion failing to upload, the notification distinguishing the portion from the other portions and instructing the user to cause uploading of the portion to be re-initiated.

12. The system of claim 1, wherein the non-indexing file storage system is a distributed non-indexing file storage system; and
wherein the one or more processors are configured to:
upload the file in a distributed manner to the distributed non-indexing file storage system.

13. The system of claim 1, wherein the one or more processors are configured to:

provide analytics regarding the file to the user as the file is being uploaded to the non-indexing file storage system in lieu of the transactional database.

14. The system of claim 1, wherein the one or more processors are configured to:
   determine that the file is to be uploaded to the non-indexing file storage system in lieu of the transactional database based at least in part on the entity to which the user belongs and a reference entity being same.

15. A method of offloading upload processing of a file in a distributed system, the method comprising:
   receiving a request from a user to upload the file to a transactional database of a database management system in the distributed system;
   extracting information, which includes at least one of (1) an estimated workload associated with uploading the file, (2) a location of the file, or (3) an entity with which the file is associated, from the request;
   determining that the file is to be uploaded to a non-indexing file storage system in lieu of the transactional database based at least in part on the at least one of (1) the estimated workload associated with uploading the file, (2) the location of the file, or (3) the entity with which the file is associated satisfying one or more criteria;
   generating a key that includes a hash by converting specified information, which includes at least one of (1) the estimated workload associated with uploading the file, (2) the location of the file, or (3) the entity with which the file is associated, from the extracted information and a secret to create the hash;
   providing the key to the user based at least in part on a determination that the file is to be uploaded to the non-indexing file storage system in lieu of the transactional database;
   receiving the key and at least a portion of the file from the user; and
   initiating uploading of the file to the non-indexing file storage system in lieu of the transactional database based at least in part on receipt of the key from the user.

16. The method of claim 15, wherein receiving the request comprises:
   receiving the request at a file upload application programming interface (API) of the transactional database;
   wherein generating the key comprises:
      generating the key by the file upload API; and
   wherein the method further comprises:
      forwarding the key from the file upload API of the transactional database to a database management system-agnostic (DBMS-agnostic) API, which stores the key; and
      validating the key by the DBMS-agnostic API by confirming that the key was generated by the file upload API.

17. The method of claim 15, wherein generating the key comprises:
   configuring the key to expire after a finite period of time; and
   wherein initiating uploading of the file comprises:
      initiating uploading of the file to the non-indexing file storage system in lieu of the transactional database based at least in part on receipt of the key from the user within the finite period of time.

18. The method of claim 17, further comprising:
   persisting the key in a distributed data store and storing the key in a cache; and
   validating the key that is received from the user, the validating comprising:
      comparing the key that is received from the user and at least one of the key persisted in the distributed data store or the key stored in the cache to determine that the key that is received from the user and the at least one of the key persisted in the distributed data store or the key stored in the cache are same; and
      verifying that the key is received from the user within the finite period of time;
   wherein initiating the uploading of the file comprises:
      uploading at least the portion of the file to the non-indexing file storage system based at least in part on validation of the key that is received from the user.

19. The method of claim 15, wherein determining that the file is to be uploaded to the non-indexing file storage system in lieu of the transactional database comprises:
   determining that the file is to be uploaded to the non-indexing file storage system in lieu of the transactional database based at least in part on the estimated workload associated with uploading the file to the transactional database being greater than or equal to a threshold workload.

20. The method of claim 15, wherein determining that the file is to be uploaded to the non-indexing file storage system in lieu of the transactional database comprises:
   determining that the file is to be uploaded to the non-indexing file storage system in lieu of the transactional database based at least in part on at least one of the following:
      the location of the file and a reference location being same;
      the entity with which the file is associated and a reference entity being same.

21. A computer program product comprising computer-readable hardware having instructions recorded thereon for enabling a processor-based system to perform operations to offload upload processing of a file in a distributed system, the operations comprising:
   extract information, which includes at least one of (1) a size of the file, (2) a credential of a user, or (3) an entity to which the user belongs, from a request that is received from the user, the request requesting upload of the file to a transactional database of a database management system in the distributed system;
   determine that the file is to be uploaded to a non-indexing file storage system in lieu of the transactional database based at least in part on the at least one of (1) the size of the file, (2) the credential of the user, or (3) the entity to which the user belongs satisfying one or more criteria;
   generate a key that includes a hash by converting specified information, which includes the at least one of (1) the size of the file, (2) the credential of the user, or (3) the entity to which the user belongs, from the extracted information and a secret to create the hash;
   provide the key to the user based at least in part on a determination that the file is to be uploaded to the non-indexing file storage system in lieu of the transactional database; and
   initiate uploading of the file to the non-indexing file storage system in lieu of the transactional database based at least in part on receipt of the key and at least a portion of the file from the user.

* * * * *